United States Patent [19]

Yamamoto et al.

[11] Patent Number: 5,572,057
[45] Date of Patent: Nov. 5, 1996

[54] SEMICONDUCTOR ACCELERATION SENSOR WITH MOVABLE ELECTRODE

[75] Inventors: Toshimasa Yamamoto, Bisai; Yukihiro Takeuchi, Seto; Yoshinori Ohtsuka, Okazaki; Kazuhiko Kano, Obu, all of Japan

[73] Assignee: Nippondenso Co., Ltd., Kariya, Japan

[21] Appl. No.: 360,940

[22] Filed: Dec. 21, 1994

[30] Foreign Application Priority Data

Dec. 21, 1993 [JP] Japan .................................. 5-322348
Jan. 19, 1994 [JP] Japan .................................. 6-004162

[51] Int. Cl.$^6$ .................................................. H01L 29/82
[52] U.S. Cl. ........................ 257/417; 257/418; 257/419; 257/420; 73/536; 73/514.18; 73/514.21; 73/514.22; 73/514.37; 73/DIG. 1
[58] Field of Search .................................. 257/417, 418, 257/419, 420; 73/536, 629, 632, 634, 722, 728, 517 R, 517 A, 517 AV, 514.21, 514.22, 514.18, 514.29, 514.36, 514.37, DIG. 1

[56] References Cited

U.S. PATENT DOCUMENTS

| 4,571,661 | 2/1986 | Hoshino ........................ 257/418 X |
| 5,103,279 | 4/1992 | Gutteridge ..................... 257/417 X |
| 5,121,180 | 6/1992 | Beringhause et al. ........... 257/417 |
| 5,126,812 | 6/1992 | Greiff ............................. 257/417 |

FOREIGN PATENT DOCUMENTS

| 194953 | 9/1986 | European Pat. Off. . |
| 369352 | 5/1990 | European Pat. Off. . |
| 2-134570 | 5/1990 | Japan . |
| 4-25764 | 1/1992 | Japan . |

OTHER PUBLICATIONS

Payne et al: "Surface Micromachines Accelerometer A Technology Update", SAE 910496, pp. 127–135, 1990.
Nathanson et al: "The Resonant Gate Transistor", IEEE Transactions on Eletron Devices, vol. Ed–14, No. 3, Mar. 1967, pp. 117–133.
Nathanson et al: "A Resonant–Gate Silicon Surface Transistor with High–Q Band Pass Properties," Applied Physics Letters, vol. 7, No. 4, pp 84–86, is Aug. 1965.

*Primary Examiner*—William Mintel
*Attorney, Agent, or Firm*—Cushman, Darby & Cushman

[57] ABSTRACT

Adverse effects due to electrostatic force between a semiconductor substrate and a movable electrode are avoided with a new structure. A movable electrode of beam structure is disposed at a specified interval above a p-type silicon substrate. Fixed electrodes, each composed of an impurity diffusion layer, are disposed on both sides of the movable electrode on the p-type silicon substrate; these fixed electrodes are self-aligningly with respect to the movable electrode. The movable electrode is displaced in accompaniment to the action of acceleration, and acceleration is detected by change (fluctuation) in current between the fixed electrodes generated by means of this displacement. Additionally, an electrode for movable electrode upward-movement use is disposed above the movable electrode, a potential difference is given between the movable electrode and the electrode for movable electrode upward-movement use, and attractive force of the movable electrode to the silicon substrate is alleviated.

65 Claims, 27 Drawing Sheets

SEMICONDUCTOR ACCELERATION SENSOR WITH MOVABLE ELECTRODE

CROSS REFERENCE TO RELATED APPLICATION

This application is based upon and claims the benefit of priority of the prior Japanese Patent applications No. 5-322348 filed on Dec. 21, 1993 and No. 6-4162 filed on Jan. 19, 1994, the contents of each being incorporated herein by reference.

BACKGROUND OF THE INVENTION

1. Field of the Invention

The present invention relates to a semiconductor acceleration sensor. More particularly, the present invention relates to a semiconductor acceleration sensor suitable for body control, engine control, airbag control, and the like of a vehicle.

2. Related Arts

Accurate detection of a comparatively low level (0 to +1 G) acceleration at a low frequency level (0 to 100 Hz) is necessary in an acceleration sensor for a vehicle. Herein, "1 G" is a unit of acceleration representing 9.8 m/sec$^2$.

A piezoelectric type acceleration sensor utilizing a piezoelectric effect, an electromagnetic type acceleration sensor utilizing a differential transformer, and semiconductor types, such as a semiconductor strain gauge type or an electrostatic capacitance type acceleration sensor, are widely known for vehicle use. Of these, the semiconductor types are most capable of detecting low acceleration levels and low frequency levels with good accuracy and suitable for high volume production at low cost.

Additionally, the electrostatic capacitance type acceleration sensor is characterized by a high detection sensitivity in comparison with the strain gauge type.

The device disclosed in EP 0 369 352 B1, which is an electrostatic capacitance type acceleration sensor, is shown in FIG. 27. In FIG. 27, the detector portion of the electrostatic capacitance type acceleration sensor is composed of a directly bonded substrate, which is formed from three silicon substrates 201, 202, and 203 with thermal oxidation films 204 interposed therebetween. A silicon beam 205 and movable electrode 206 are formed on the silicon substrate 201 before bonding by means of etching. Moreover, fixed electrodes 207 and 208 composed of polycrystalline silicon are also formed on the silicon substrates 202 and 203 before bonding. The movable electrode 206, which functions as weight, is supported by means of the silicon beam 205, and in accordance with the vertical acceleration, which acts upon the movable electrode 206, the dimensions of the gaps between the movable electrode 206 and the fixed electrodes 207 and 208 change. As a result, the electrostatic capacitance of the gap portions changes in accordance with the acceleration acting on the detector portion, and detection of acceleration is accomplished by outputting this change to an external electronic circuit via a bonding pad 209.

However, the electrostatic capacitance type acceleration sensor requires sophisticated machining technology in order to machine the silicon substrate to 100 to 200 pm and form a thin beam, and along with this, production costs also increase.

In short, a total of three silicon substrates are required, including one silicon substrate to form a movable electrode and two silicon substrates to form fixed electrodes. As a result, it is difficult to reduce cost. Moreover, because mutual silicon substrates must be bonded via thermal oxidation films, thermal constraints are applied in terms of the process. Furthermore, because the detection of acceleration is performed by detecting changes in electrostatic capacitance, the electrode surface area, which forms the electrostatic capacitance, cannot be made smaller than the measurement lower limit thereof. As a result, smaller sizes could not be expected.

SUMMARY OF THE INVENTION

In an attempt to overcome the deficiencies in the above-described devices, the present inventors propose a semiconductor acceleration sensor shown in FIGS. 28 to 31, which is composed of a small number of substrates.

FIG. 28 shows a plan view of a semiconductor acceleration sensor thereof. Additionally, FIG. 29 shows a sectional view taken along line 29—29 of FIG. 28, FIG. 30 shows a sectional view taken along line 30—30 of FIG. 28, and FIG. 31 shows a sectional view taken along line 31 of FIG. 28. A movable electrode 211 having a beam structure is disposed at a specified interval above a semiconductor substrate 210, and electrode portions 212 and 213 protrude from movable electrode 211. Fixed electrodes 214, 215, 216, and 217, each composed of an impurity diffusion layer, are disposed at both sides of the electrode portions 211 and 212 of the movable electrode 211, respectively. A voltage is applied between the electrode portions 212 and 213 and the substrate 210, and inversion layers 218 and 219 are formed between the fixed electrodes 214 and 215 and between the fixed electrodes 216 and 217, respectively. Accordingly, currents flowing through these inversion layers 218 and 219 change in accordance with the displacement of the movable electrode 211 accompanying the action of acceleration. That is to say, acceleration is detected by changes in current flowing between the fixed electrodes.

Additionally, according to this semiconductor acceleration sensor, it is necessary to apply a voltage between the substrate 210 having a source and drain for forming a sensing transistor and the movable electrode 211 disposed opposite thereto via an air gap. Thus, there is concern that an electrostatic force may act between the substrate 210 and the movable electrode 211. Due to this, the movable electrode 211 may be attracted toward and contact the substrate 210, destroying the function of the sensor. Accordingly, on the semiconductor substrate 210, a lower electrode 220 is disposed in a region wherein at least the fixed electrodes 214 to 217 are not disposed and facing the movable electrode 211. Furthermore, an electrical potential equal to the electrical potential of the movable electrode 211 is applied to this lower electrode 220 in order to reduce the electrostatic force generated between the semiconductor substrate 210 and the movable electrode 211 to the greatest extent possible.

However, when a lower electrode 220, the electrical potential of which is equal to the movable electrode 211, is provided on a substrate portion so as to oppose the movable electrode 211 as shown in FIG. 32, electrical isolation from the fixed electrodes 214 and 215, which become a sensing region (source and drain region), becomes difficult. Briefly, as shown in FIG. 33, the lower electrode 220 is disposed to approach the fixed electrodes 214 and 215 (source and drain region) formed on the semiconductor substrate 210 functions as a gate electrode. Moreover, leakage current is generated between the fixed electrodes 214 and 215 and the lower electrode 220. Additionally, problems in the positional alignment precision of the movable electrode 211 and lower electrode 220 are also produced.

In light of the above-described problems, it is an object of this invention to provide a semiconductor acceleration sensor of new structure which can avoid adverse effects due to electrostatic force between a semiconductor substrate and a movable electrode.

A semiconductor acceleration sensor according to the present invention includes a semiconductor substrate, a beam structure having a movable electrode disposed over a specified interval above the semiconductor substrate, and fixed electrodes composed of an impurity diffusion layer formed at both sides of the movable electrode on the semiconductor substrate. By means of this configuration, acceleration is detected by changes in current between the fixed electrodes generated by the displacement of the movable electrode accompanying the action of acceleration. Further, the acceleration sensor of the present invention includes an electrode for movable electrode upward-movement use which causes the movable electrode to move upward in a direction away from the substrate. The electrode for movable electrode upward-movement use is disposed at a height equal to or greater than the height at which the movable electrode is disposed, and a potential difference is provided between the movable electrode and the electrode for movable electrode upward-movement use to alleviate an attractive force toward the semiconductor substrate.

Moreover, it is acceptable that the electrode for movable electrode upward-movement use be disposed immediately above the movable electrode, or be disposed at a height equal to the height at which the movable electrode is disposed.

When acceleration is exerted, the movable electrode is displaced, and acceleration is detected by means of fluctuations in current between the fixed electrodes. Additionally, the electrode for movable electrode upward-movement use is disposed at a height equal to or greater than the movable electrode, and a potential difference is applied between the movable electrode and the electrode for movable electrode upward-movement use. As a result, an attractive force of the movable electrode toward the semiconductor substrate is alleviated.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY PREFERRED EXEMPLARY EMBODIMENTS (First Embodiment)

A first embodiment according to the present invention will be described hereinafter with reference to the drawings.

Figure 1:
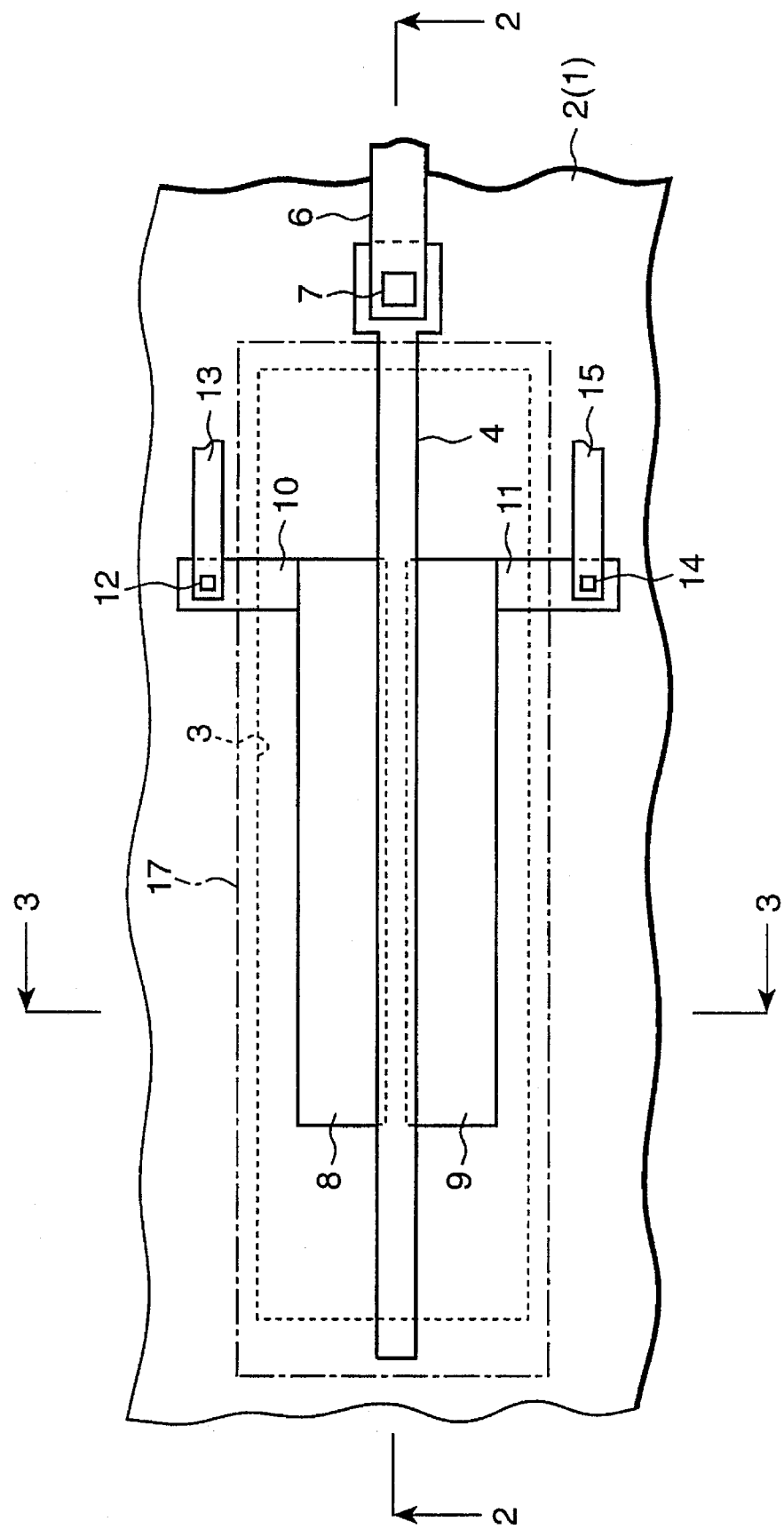
FIG. 1 is a plan view of a semiconductor acceleration sensor according to a first embodiment.
Figure 2:
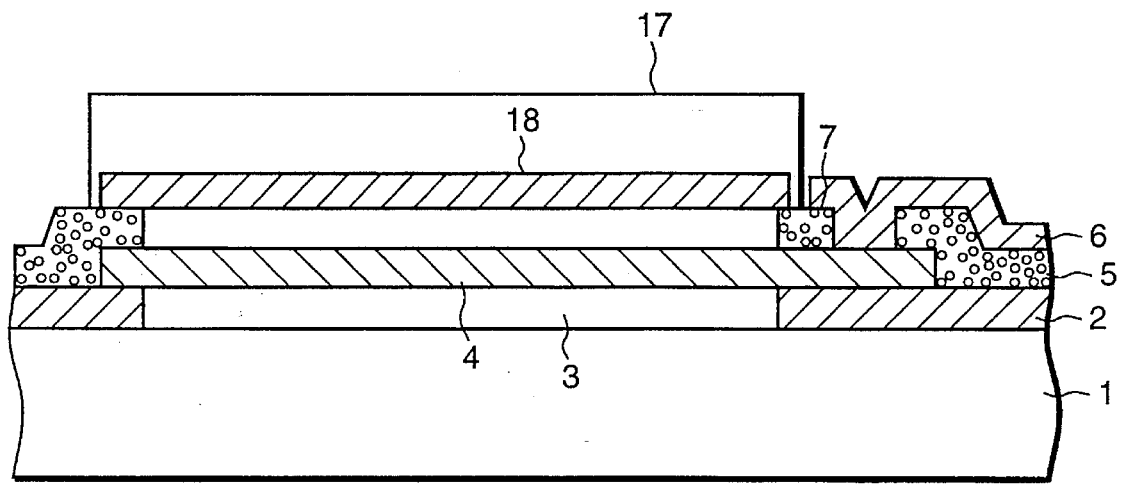
FIG. 2 is a sectional view taken along line 2—2 of FIG. 1.
Figure 3:
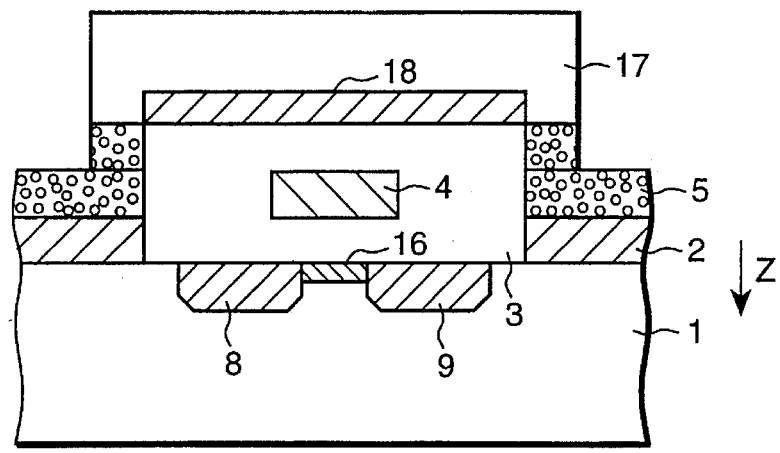
FIG. 3 is a sectional view taken along line 3—3 of FIG. 1.

FIG. 1 shows a plan view or a semiconductor acceleration sensor according to a first embodiment. Additionally, FIG. 2 shows a sectional view taken along line 2—2 of FIG. 1, and FIG. 3 shows a sectional view taken along line 3—3 of FIG. 1. Moreover, as is shown in FIGS. 2 and 3, an electrode for detecting movable electrode upward-movement 18 (silicon substrate 17) is disposed above a movable electrode 4. In FIG. 1 this electrode for movable electrode upward-movement use 18 (silicon substrate 17) is indicated by dashed lines.

On a p-type silicon substrate 1, an insulation film 2, which is composed of silicon dioxide, silicon nitride, or the like, is formed. Additionally, a region of oblong configuration with no insulation film 2, i.e., a gap (interval) 3, is formed on the p-type silicon substrate 1 (see FIG. 1). A movable electrode 4, which is doubly supported by a beam structure, is disposed on the insulation film 2 so as to span the gap 3. The movable electrode 4 is composed of polycrystalline silicon extending linearly in a belt configuration. Additionally, the p-type silicon substrate 1 and movable electrode 4 are insulated by means of the insulation film 2.

Moreover, the gap 3 disposed below the movable electrode 4 is formed by means of etching a portion of the insulation film 2 as a sacrificial layer. During this sacrificial layer etching, an etching liquid, which etches the insulation film 2 as the sacrificial layer selectively, is employed.

Additionally, a layer insulation film 5 is disposed on the insulation film 2, and an aluminum wiring 6 for the purpose of electrical connection with the movable electrode 4 via a contact hole 7 is disposed thereabove.

In FIG. 3, fixed electrodes 8 and 9 composed of an impurity diffusion layer are disposed on both sides of the movable electrode 4 on the p-type silicon substrate 1. These fixed electrodes 8 and 9 are formed by means of introducing n-type impurities into the p-type silicon substrate 1 by means of ion implantation or the like.

Further, in addition to polycrystalline silicon, a heat-resistant metal, such as tungsten, may be employed for the movable electrode (doubly supported beam) 4.

As shown in FIG. 1, leads 10 and 11 composed of an impurity diffusion layer are formed on the p-type silicon substrate 1. The leads 10 and 11 are formed by means of introducing n-type impurities into the p-type silicon substrate 1 by means of ion implantation or the like. Accordingly, the fixed electrodes 8 and 9 are electrically connected to the leads 10 and 11, respectively.

Furthermore, the lead 10 is electrically connected to an aluminum wiring 13 via a contact hole 12. The lead 11 is also electrically connected to an aluminum wiring 15 via a contact hole 14. Accordingly, the aluminum wirings 13, 15, and 6 are connected to an external electronic circuit.

Additionally, as shown in FIG. 3, an inversion layer 16 is formed between the fixed electrodes 8 and 9 on the p-type silicon substrate 1. The inversion layer 16 is produced by means of applying a voltage between the silicon substrate 1 and the movable electrode 4.

Moreover, a silicon substrate 17 of high resistance is formed at a specified interval above the movable electrode 4 on the layer insulation film 5. An electrode for movable electrode upward-movement use 18 composed of an impurity diffusion layer is formed on the lower surface of this silicon substrate 17, i.e., the surface opposing the movable electrode 4. This electrode for movable electrode upward-movement use 18 is formed by means of introducing n-type impurities into the p-type silicon substrate 17 by means of ion implantation or the like. Further, wiring, which is not shown, is provided for the electrode for movable electrode upward-movement use 18 (not shown).

A method of production of a semiconductor acceleration sensor structured in this manner will be described below with reference to FIGS. 4 to 14. Herein, the steps for a sensor portion are indicated at the left-hand side of the respective drawings, and the steps for a transistor portion required for a processor circuit is indicated at the right-hand side of the respective drawings.

Figure 4:
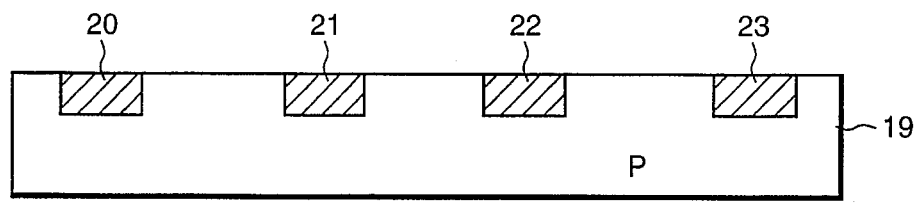
FIG. 4 through FIG. 14 are sectional views depicting respective production steps of a semiconductor acceleration sensor according to the first embodiment.

As shown in FIG. 4 a p-type silicon substrate 19 is prepared, a photolithographic step is undergone, and n-type diffusion layers 20, 21, 22, and 23, which become lead portions of sources and drains of a sensor and a transistor, are formed by means of ion implantation or the like.

Figure 5:
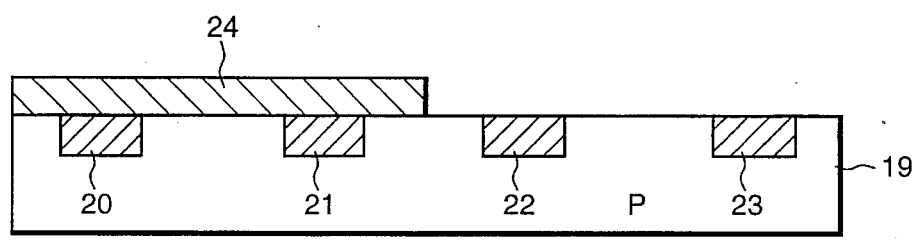

Accordingly, as shown in FIG. 5, an insulation film 24 of which a portion thereof becomes a sacrificial layer is formed in the sensor portion (left-hand side of FIG. 5). At this time, it is also acceptable to form the insulation film 24 over the entirety of the substrate and thereafter remove insulation film from the transistor portion (right-hand side).

Figure 6:
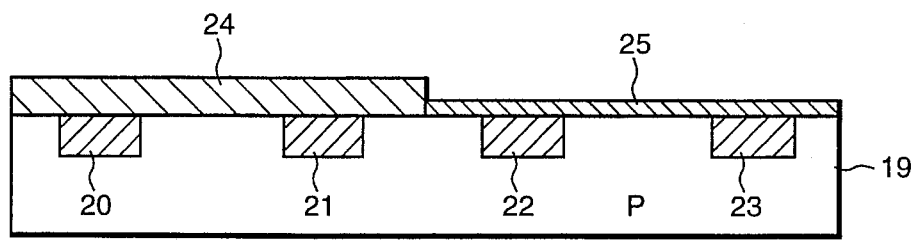
Figure 7:
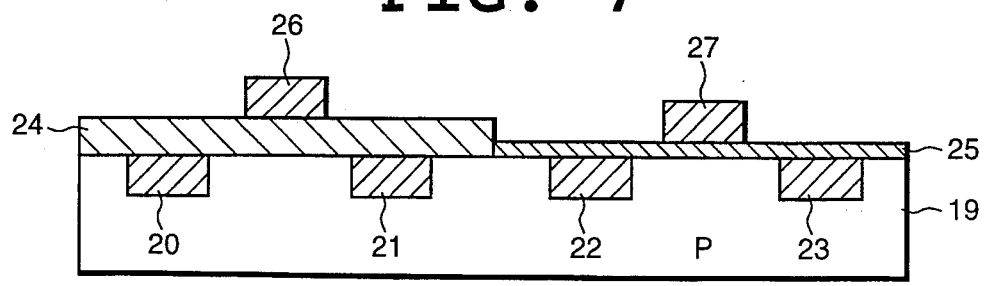

Further, as shown in FIG. 6, a gate oxide film 25 is formed on the transistor portion by means of gate oxidation. Accordingly, as shown in FIG. 7, polycrystalline silicon is deposited, a photolithographic step is undergone, and a movable electrode 26 or the sensor portion and a gate electrode 27 or the transistor portion are patterned by dry etching or the like.

Figure 8:
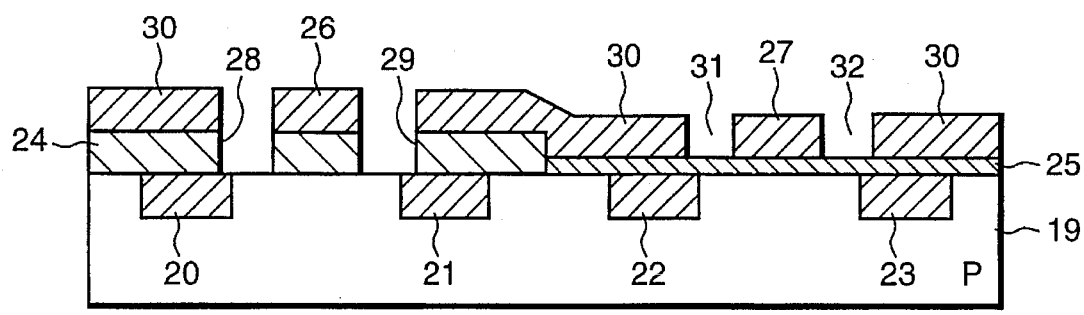

Next, as shown in FIG. 8, in order to form fixed electrodes for the sensor, a photolithographic step is undergone and openings 28 and 29 are formed in the insulation film 24 and in a photoresist 30 so as to be aligned with respect to the movable electrode 26. Simultaneously, in order to form a source and drain of the transistor, openings 31 and 32 are formed in photoresist 30.

Figure 9:
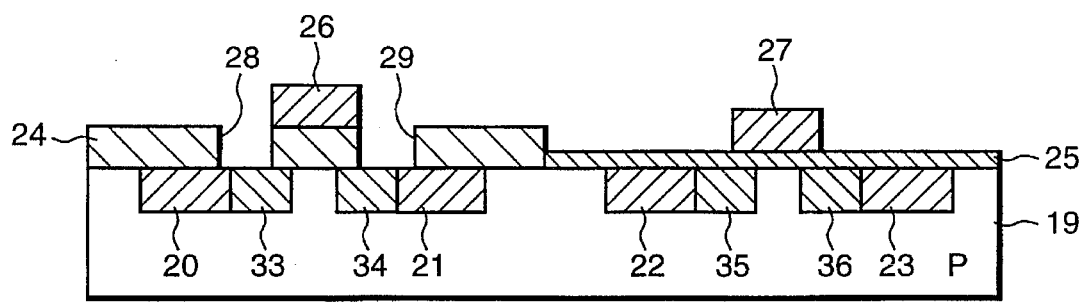

Moreover, n-type impurities are introduced by means of ion implantation or the like from the openings 28 and 29 of the insulation film 24 and photoresist 30 and from the openings 31 and 32 of the photoresist 30 so as to align with respect to the movable electrode 26 and gate electrode 27. By doing so, as shown in FIG. 9, fixed electrodes 33 and 34 of the sensor, and source and drain regions 35 and 36 of the transistor, all of which are composed of n-type diffusion layers, are formed.

Figure 10:
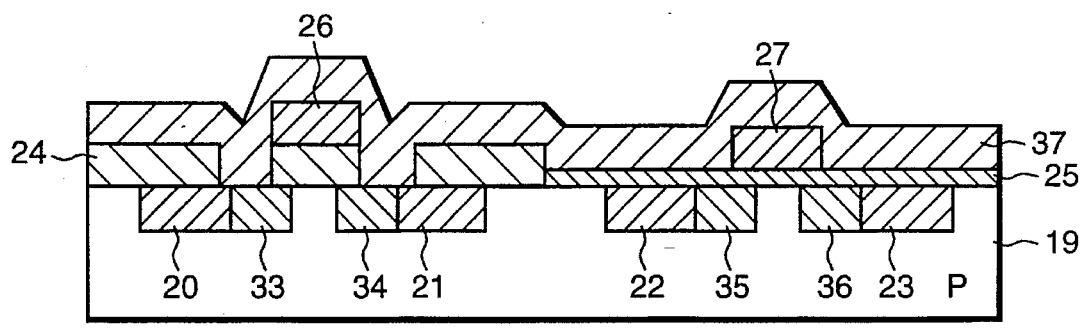
Figure 11:
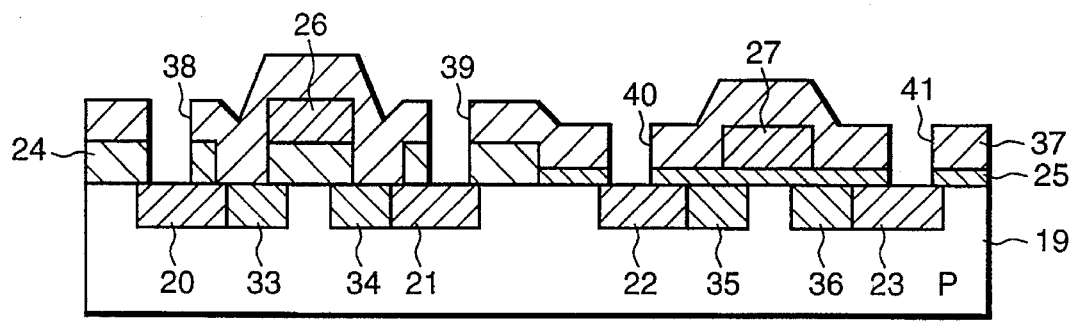

Next, as shown in FIG. 10, a layer insulation film 37 for the purpose of electrically insulating the movable electrode 26i gate electrode 27, and aluminum leads from each other is formed. As shown in FIG. 11, contact holes 38, 39, 40, and 41 for the purpose of electrically connecting diffusion layers for lead use 20, 21, 22, and 23 to aluminum wirings are formed in the layer insulation film 37 through a photolithographic step.

Figure 12:
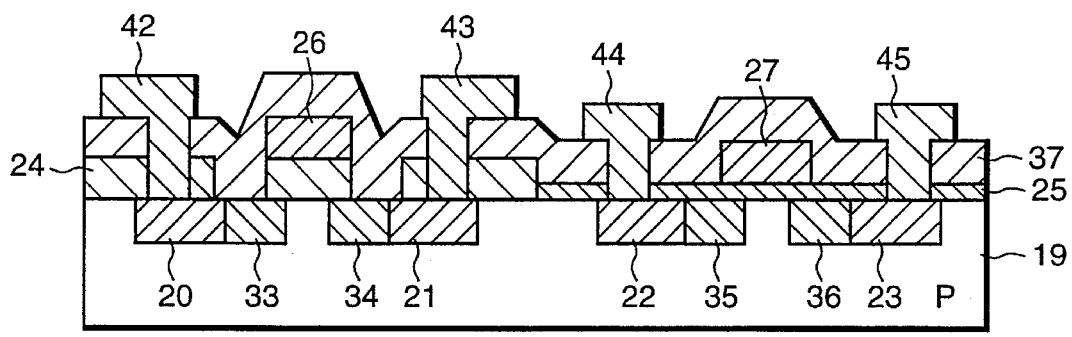
Figure 13:
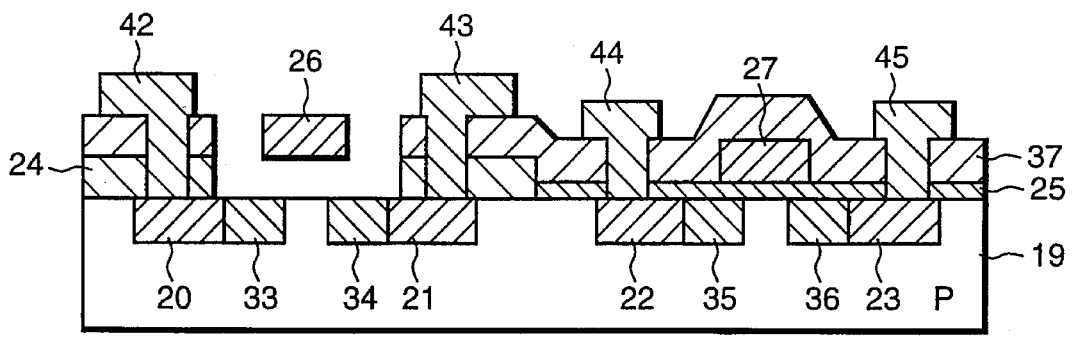

Furthermore, as shown in FIG. 12, aluminum, which is an electrode material, is deposited to form aluminum wirings 42, 43, 44, 45, and so on through a photolithographic step. Then, as shown in FIG. 13, a window is formed on a portion of the layer insulation film 37, and a corresponding portion of the insulation film 24, which acts as a sacrificial layer, is etched away with respect to the sensor portion.

Figure 14:
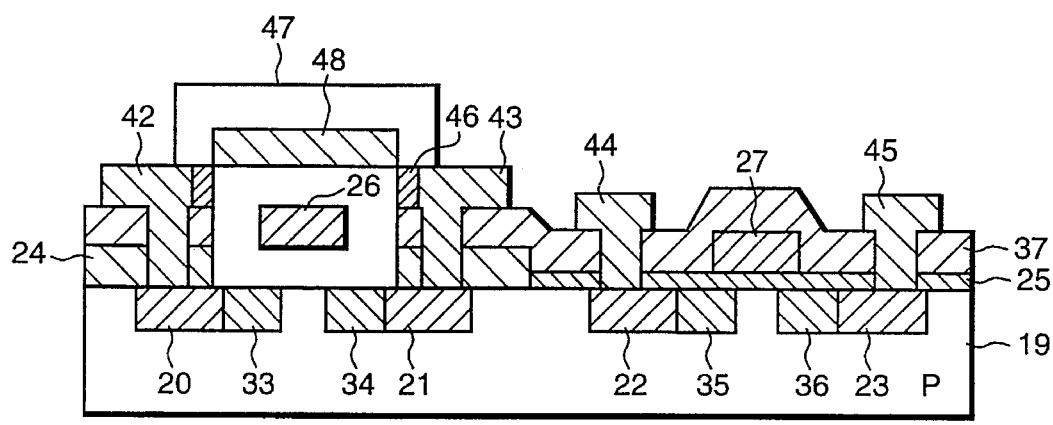

Next, as shown in FIG. 14, a silicon substrate 47 is disposed via an insulation film 46 above the movable electrode 26. The lower surface (the surface opposing the movable electrode 26) of the silicon substrate 47 is separated from the movable electrode 26 by a specified interval. Also, an electrode for movable electrode upward-movement use 48 composed of an impurity diffusion layer is formed on the lower surface (the surface opposing the movable electrode 26) of the silicon substrate 47. This electrode for movable electrode upward-movement use 48 is formed by means of introducing impurities into the silicon substrate 47 by means of ion implantation or the like. Moreover, wiring is pre-provided for the electrode for movable electrode upward-movement use 48.

Incidentally, it is preferable that the opposing interval of the electrode for movable electrode upward-movement use 48 and the movable electrode 26 be made equal to the opposing interval of the silicon substrate 19 and the movable electrode 26. This is because if the opposing intervals are made equal, then by electrically connecting and equalizing the potential of the electrode for movable electrode upward-movement use 48 and silicon substrate 19, the electrostatic forces acting on the movable electrode 26 are equalized in the vertical direction of the movable electrode 26, and displacement of the movable electrode 26 toward the substrate 19 can easily be prevented.

Also, if the electrostatic forces, which are generated on and below the movable electrode 26 and are exerted thereon, can be equalized in the vertical direction, it is acceptable that the foregoing two opposing intervals, one being on the movable electrode 26 and the other being under the movable electrode 26, can have a different value.

Manufacturing steps of a transistor type semiconductor acceleration sensor are completed in this manner.

Operation of the acceleration sensor according to the present embodiment will be described next with reference to FIG. 3.

When voltage is applied between the movable electrode 4 and silicon substrate 1 and between the fixed electrodes 8 and 9, an inversion layer 16 is formed and current flows between the fixed electrodes 8 and 9. In a case where the acceleration sensor is subjected to an acceleration, the movable electrode 4 is displaced in the Z direction (direction perpendicular to the substrate) indicated in the drawing. As a result, the carrier concentration of the inversion layer 16 increases by means of a change in electrical field intensity, and current increases. In this manner, this acceleration sensor can detect acceleration by fluctuations in an amount of current.

Additionally, a potential difference is applied between the movable electrode 4 and the electrode for movable electrode upward-movement use 18. As a result of this potential, an attractive force of the movable electrode 4 toward the semiconductor substrate 1 is alleviated. That is to say, an approaching action due to electrostatic forces between the silicon substrate 1 and the movable electrode 4 are typically generated, but if an electrode for movable electrode upward-movement use 18 is disposed above the movable electrode 4 and a potential difference is provided between the movable electrode 4 and the electrode for movable electrode upward-movement use 18, an attractive force of the movable electrode 4 toward the upper electrode 18 is produced. As a result, the attractive force of the movable electrode 4 toward the semiconductor substrate 1 is alleviated.

As shown in FIGS. 1 to 3, this embodiment includes a p-type silicon substrate 1 (semiconductor substrate), a movable electrode 4 having a beam structure disposed at a specified interval over the p-type silicon substrate 1, and fixed electrodes 8 and 9 composed of impurity diffusion layers, which are formed so as to self align with respect to the movable electrode 4 at both sides of the movable electrode 4 on the semiconductor substrate. An acceleration is detected by changes (fluctuations) in the current between the fixed electrodes 8 and 9 generated by means of displacement of the movable electrode 4 accompanying the action of acceleration. Furthermore, an electrode for movable electrode upward-movement use (upper electrode) 18 is disposed above the movable electrode 4 and a potential difference is provided between the movable electrode 4 and the upper electrode 18 so as to alleviate attractive forces toward the silicon substrate 1. That is to say, a force acts to lift the movable electrode 4 by means of the upper electrode 18. In this manner, the approaching action of the silicon substrate 1 and movable electrode 4 due to electrostatic forces produced between the silicon substrate 1 and movable electrode 4 can be avoided with a new structure wherein the upper electrode 18 is disposed at a height greater than the height at which the movable electrode 4 is disposed.

Figure 28:
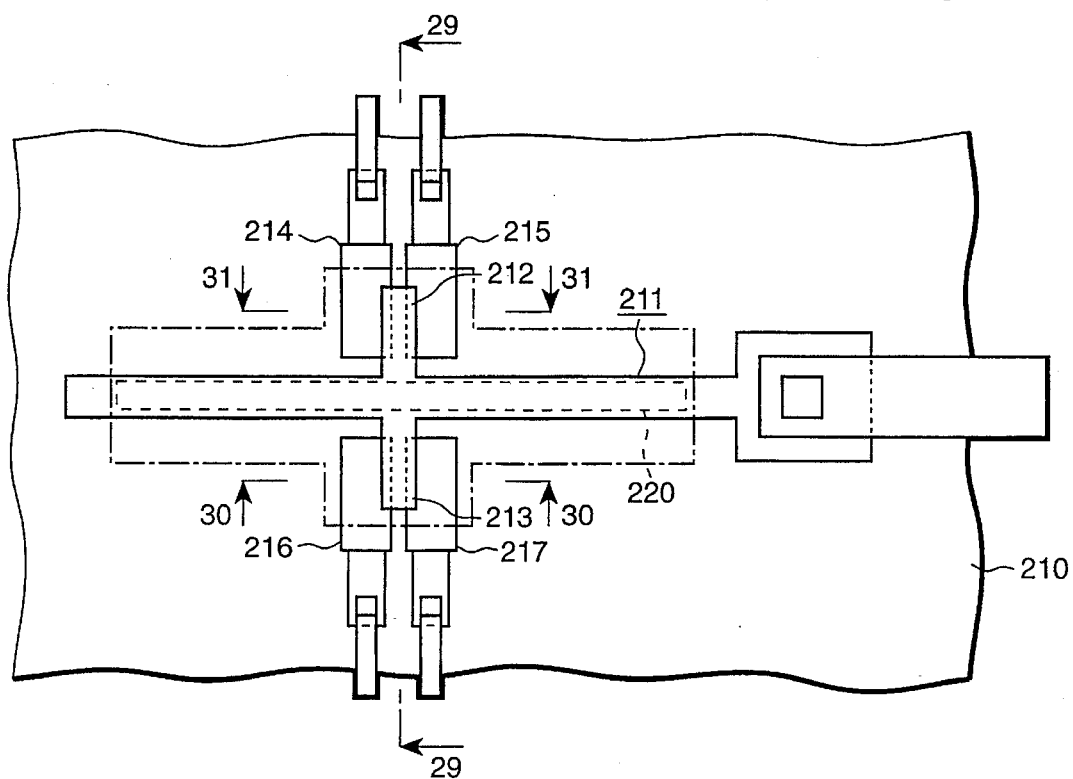
FIG. 28 is a plan view of a semiconductor acceleration sensor according to prior work of the inventors.
Figure 29:
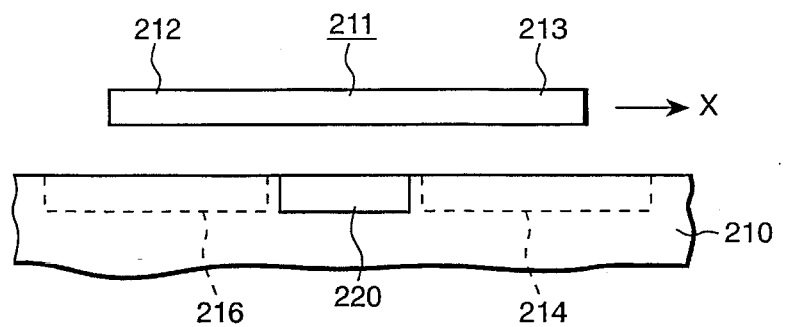
FIG. 29 is a sectional view taken along line 29—29 of FIG. 28.
Figure 30:
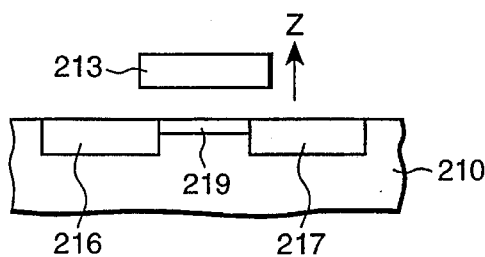
FIG. 30 is a sectional view taken along line 30—30 of FIG. 28.
Figure 31:
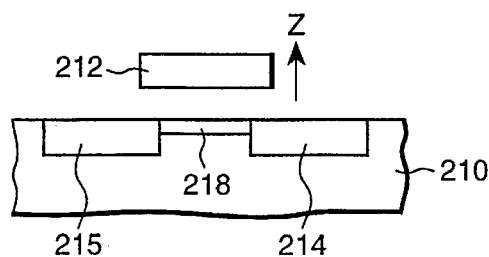
FIG. 31 is a sectional view taken along line 31—31 of FIG. 28.

Additionally, in a semiconductor acceleration sensor (FIG. 28) devised by the inventors, a lower electrode, an electrical potential of which is equal to a beam also acting as a gate electrode, was provided on a substrate portion opposing the beam (movable electrode) in order to avoid the approaching action due to electrostatic forces between a semiconductor substrate and movable electrode. However, this produced problems in the positional alignment precision of the beam and lower electrode. However, according to the present embodiment, an electrode for movable electrode upward-movement use 18 is disposed above a movable electrode 4 such that forces which raise the movable electrode 4 upward are generated by means of the upper electrode. Consequently, there is no need to align the movable electrode 4 and the electrode for upward-movement use 18 with high precision.

Furthermore, as described above using FIGS. 32 and 33, provision of a lower electrode 220 made it difficult to electrically isolate fixed electrodes 214 and 215 (source and drain regions) which become a sensing region, but according to the present embodiment, a lower electrode does not exist, therefore, there is no need to consider electrical isolation from the fixed electrodes (source and drain regions). Moreover, in FIGS. 32 and 33, leakage current was generated between the fixed electrodes 214 and 215 and the lower electrode 220, but according to this embodiment, there is no lower electrode. Thus, the generation of leakage current is avoided.

Further, the silicon substrate 17 (a part of which is the upper electrode 18) can function as a package and a stopper for the displacement of the movable electrode 4. In a sensor having a beam structure, breakage of the beam (movable electrode) due to excessive acceleration is a problem, but in a case where a movable electrode is deformed on the silicon substrate 17 side, the movable electrode 4 contacts the silicon substrate 17 without large deformation, and breakage is prevented.

(Second Embodiment)

Next, a second embodiment will be described with a focus on points of difference from the first embodiment.

Figure 15:
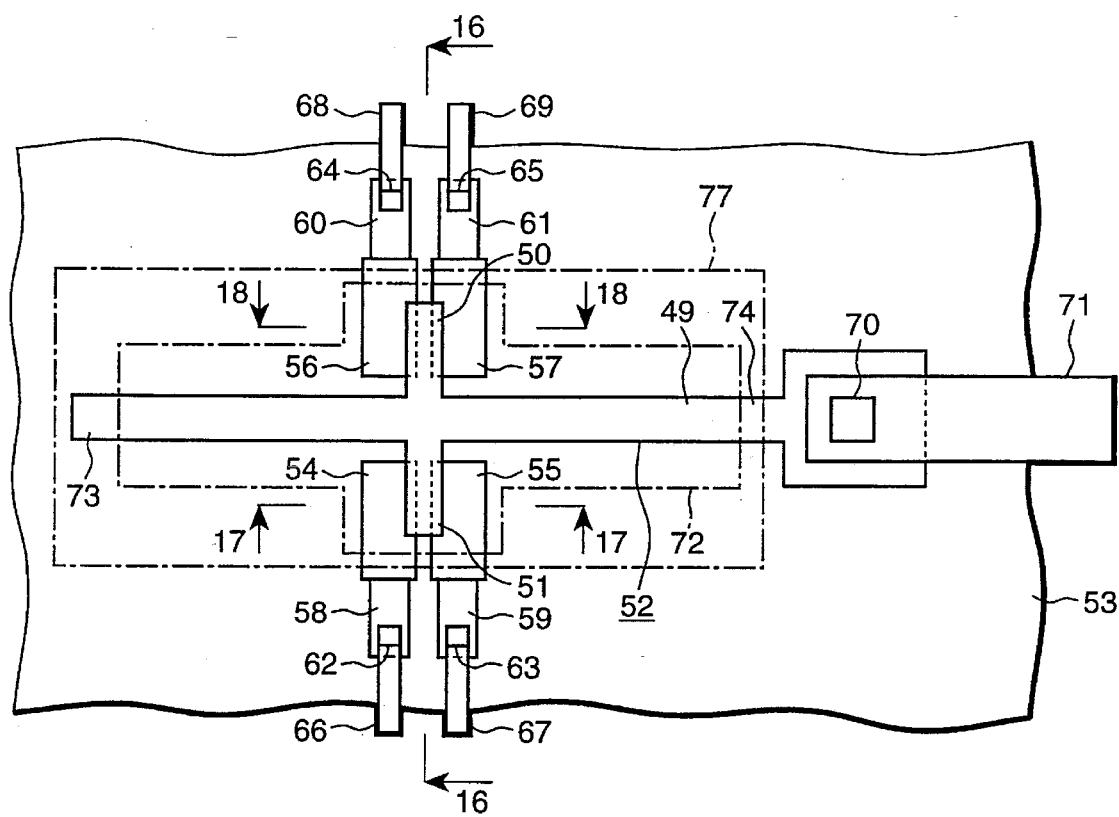
FIG. 15 is a plan view of a semiconductor acceleration sensor according to a second embodiment.
Figure 16:
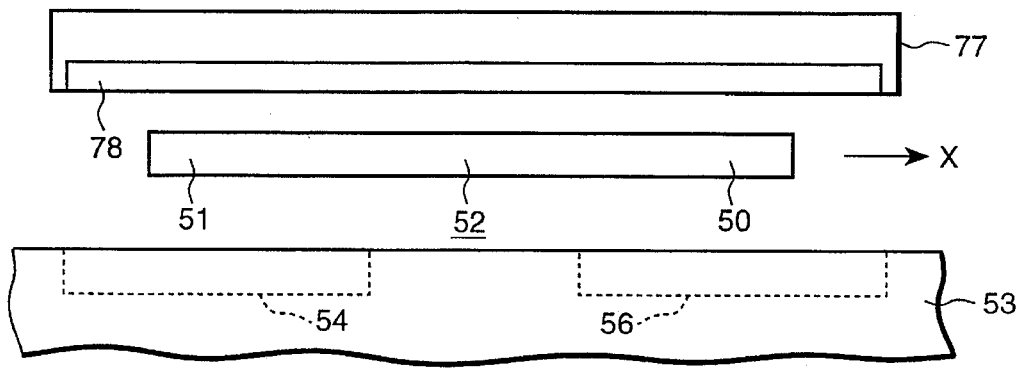
FIG. 16 is a sectional view taken along line 16—16 of FIG. 15.
Figure 17:
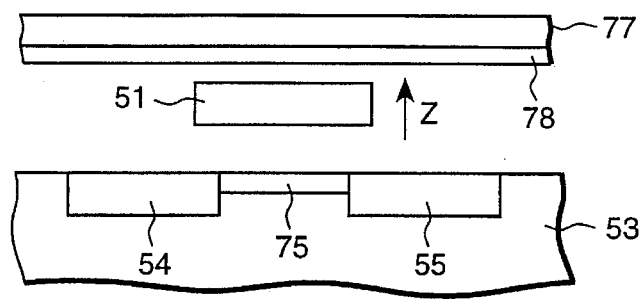
FIG. 17 is a sectional view taken along line 17—17 of FIG. 15.
Figure 18:
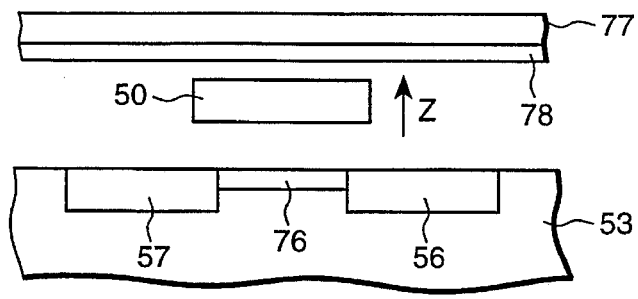
FIG. 18 is a sectional view taken along line 18—18 of FIG. 15.

FIG. 15 shows a plan view of an acceleration sensor according to the second embodiment, FIG. 16 shows a sectional view taken along line 16—16 of FIG. 15, FIG. 17 shows a sectional view taken along lines 17—17 of FIG. 15, FIG. 18 shows a sectional view taken along line 18—18 of FIG. 15.

According to the first embodiment shown in FIG. 1, a single beam functions as an elastic body, a weight, and an electrode. On the other hand, in the second embodiment shown in FIG. 15, a beam portion 49, which functions as an elastic body as well as a weight (mass), and two electrode portions 50 and 51, which function as a weight (mass) and as an electrode, form a movable electrode 52 composed of polycrystalline silicon.

Fixed electrodes 54 and 55, and 56 and 57, are formed on a p-type silicon substrate 53, so as to be aligned with the electrode portions 50 and 51 of the movable electrode 52 with respect to both sides thereof. The respective fixed electrodes 54, 55, 56, and 57, all of which are n-type diffusion layers, are connected to diffusion layers 58, 59, 60, and 61 for lead use, and are connected to aluminum wirings 66, 67, 68, and 69 via contact holes 62, 63, 64, and 65, respectively. The movable electrode 52 is connected to an aluminum wiring 71 via a contact hole 70.

A region 72 indicates an etched region of an insulation film (not illustrated) as a sacrificial layer by performing sacrificial etching. The movable electrode 52 (polycrystalline silicon) is secured by anchor portions 73 and 74 at two locations, and the electrode portions 50 and 51 assume a movable structure.

FIG. 16 illustrates that the formation of the fixed electrodes 54, 55, 56, and 57 is longer than the electrode portions 50 and 51 at both sides of the drawing. In FIGS. 17 and 18, when voltage is applied between the electrode portions 50 and 51 and the substrate 53, inversion layers 75 and 76 are formed between the fixed electrodes 54 and 55 and between the fixed electrodes 56 and 57, respectively. Accordingly, current flows between the fixed electrodes 54 and 55 and between the fixed electrodes 56 and 57.

Moreover, a silicon substrate 77 of high resistance is formed at a specified interval above the movable electrode 52 (50 and 51). An electrode for movable electrode upward-movement use 78 composed of an impurity diffusion layer is formed on the lower surface of this silicon substrate 77, i.e., the surface opposing the movable electrode 4. This electrode for movable electrode upward-movement use 78 is formed by means of introducing impurities into the p-type silicon substrate 77 by means of ion implantation or the like. Further, wiring is provided for this electrode 78.

The operation of the acceleration sensor, which is capable of two-dimensional acceleration detection, will be described with reference to FIGS. 16, 17, and 18.

In a case where this acceleration sensor is subjected to an acceleration and the electrode portions (movable electrode) 50 and 51 are displaced in the X direction (horizontal direction of the substrate) of FIG. 16, surface areas of inversion layers, i.e., the gate width in transistor terms, between both fixed electrodes change. Consequently, a current flowing between the fixed electrodes 54 and 55 on the electrode portion 51 side decreases. On the other hand, a current flowing between the fixed electrodes 56 and 57 on the electrode portion 50 side conversely increases. Furthermore, in a case where this acceleration sensor is subjected to acceleration and the electrode portions (movable electrode) 50 and 51 are displaced in the Z direction indicated in FIGS. 17 and 18, the carrier concentration of the inversion layers 75 and 76 decreases, and thereby currents decreases simultaneously.

In this manner, this acceleration sensor can detect accelerations in two dimensions by fluctuations in two amounts of current. That is to say, a set of movable electrode and corresponding fixed electrodes are made such that, and the arrangement of the components is made such that the widths of the inversion layers between fixed electrodes, i.e., gate widths, increase on the one hand and decrease on the other by means of a displacement in the horizontal direction. By means of this configuration, for example, a cross-shaped movable electrode, it becomes possible to detect acceleration in the respective horizontal and perpendicular directions of the beams from fluctuations in the two amounts of current. That is to say, in a case where the two amounts of current change in same phase, the beams are displaced perpendicular to the substrate, and conversely in a case where the two amounts of current change in reverse phase, the beams are displaced in the horizontal direction, and accelerations of two directions can be detected. This makes it possible to have detection directions of two dimensions with a single acceleration detection structure.

Additionally, a potential difference is applied between the movable electrode 52 and the electrode for upward-movement use 78. As a result, an attractive force of the movable electrode 52 toward the semiconductor substrate 53 is alleviated. That is to say, even though an approaching action due to electrostatic force between the silicon substrate 53 and the movable electrode 52 is generated, an attractive force of the movable electrode 52 toward the semiconductor substrate 53 is alleviated because a potential difference is given between the movable electrode 52 and the electrode for movable electrode upward-movement use 78.

Figure 32:
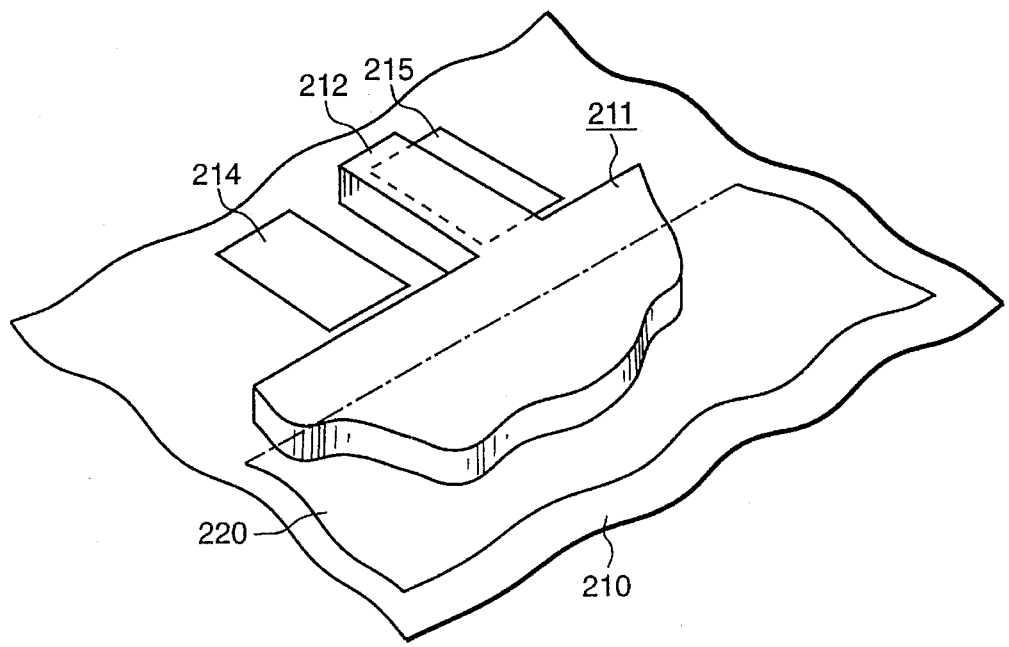
FIG. 32 is a perspective view of FIG. 28.
Figure 33:
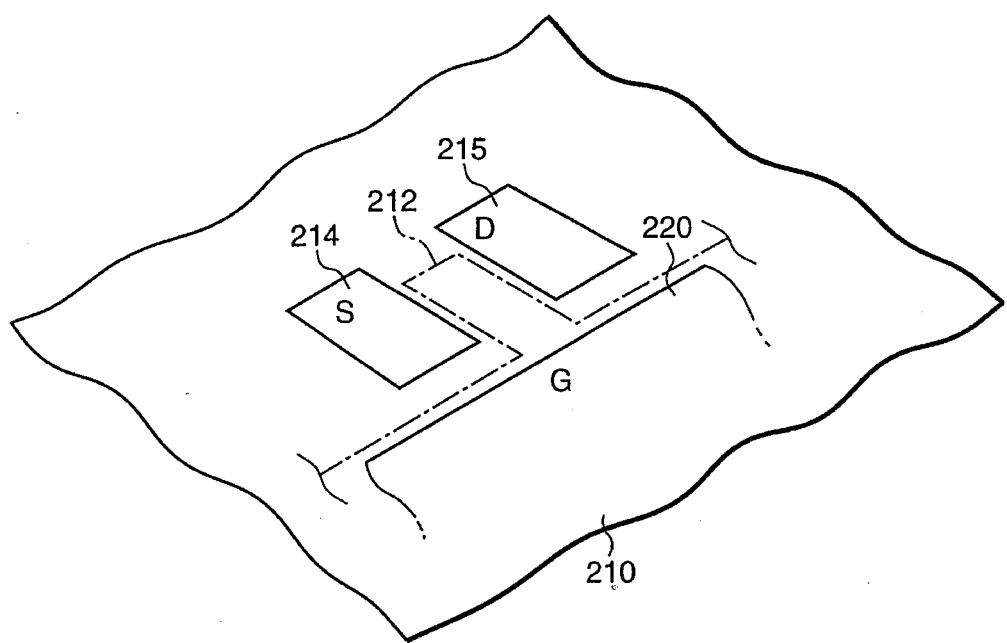
FIG. 33 is a perspective view for explaining a problem of the semiconductor acceleration sensor shown in FIG. 28.

Furthermore, according to this embodiment, provision of a lower electrode 220, which makes it difficult to electrically separate from fixed electrodes 214 and 215 (source and drain regions) as shown in FIGS. 32 and 33, does not exist, and so there is no need to consider electrical isolation from the fixed electrodes (source and drain regions).

(Third Embodiment)

Next, a third embodiment will be described with a focus on points of difference from the first embodiment.

Figure 19:
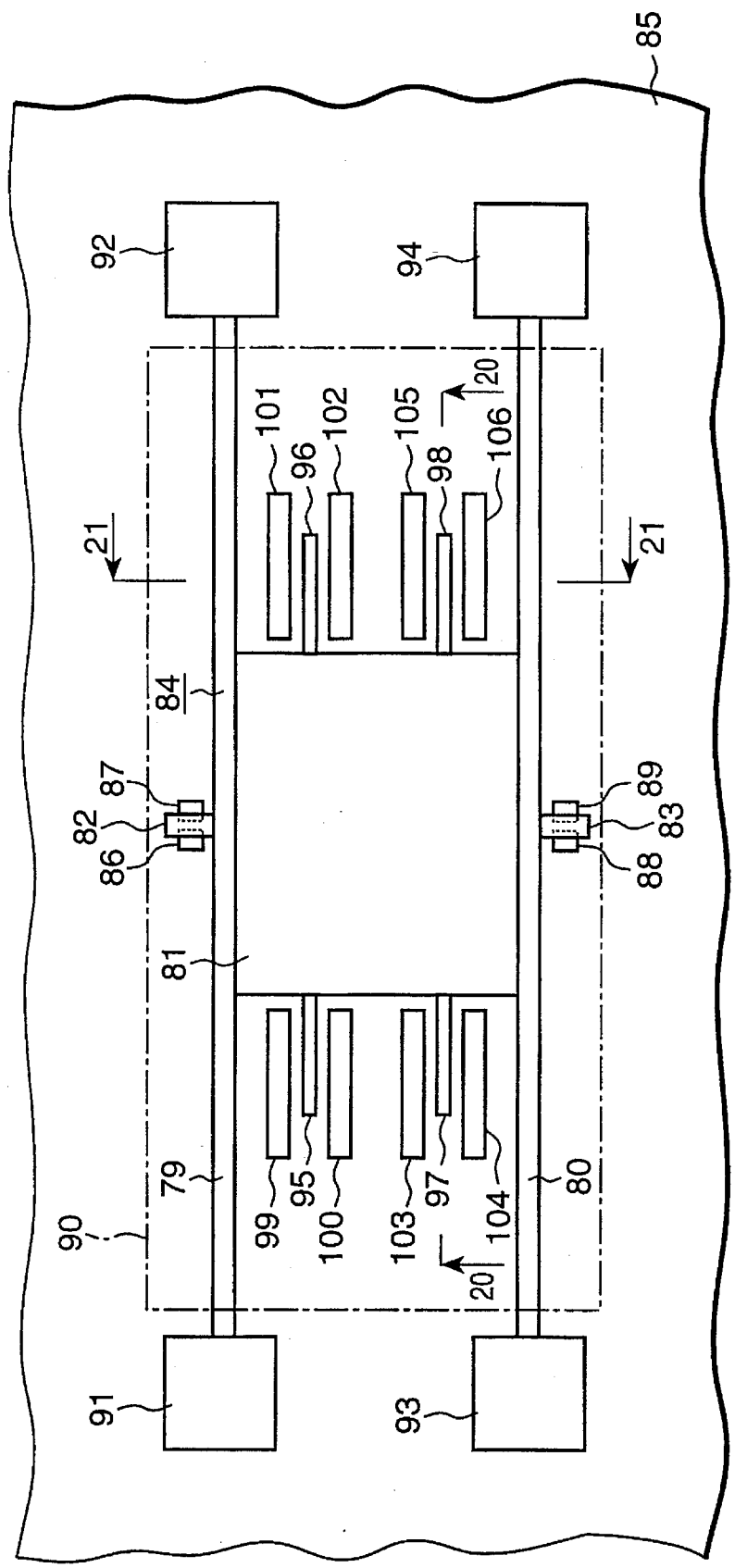
FIG. 19 is a plan view of a semiconductor acceleration sensor according to a third embodiment.
Figure 20:
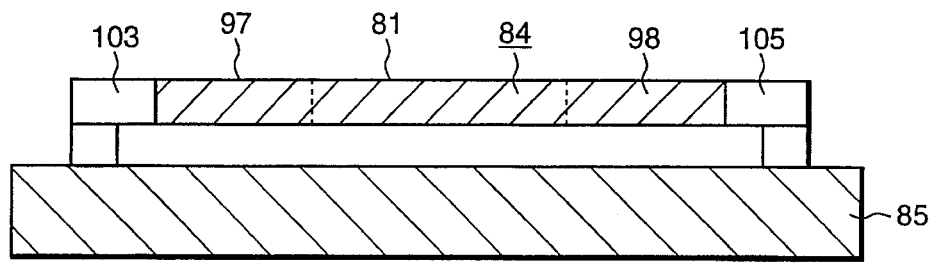
FIG. 20 is a sectional view taken along line 20—20 of FIG. 19.
Figure 21:
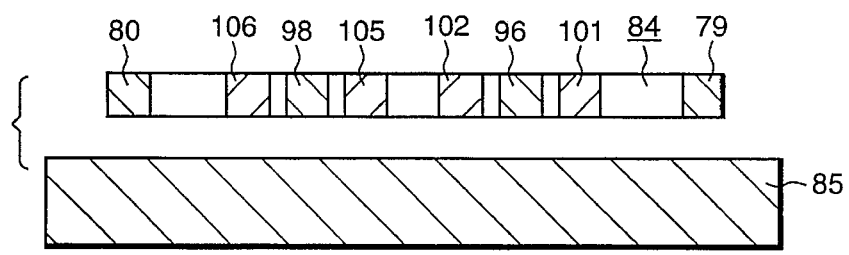
FIG. 21 is a sectional view taken along line 21—21 of FIG. 19.

FIG. 19 shows a plan view of an acceleration sensor according to the third embodiment, FIG. 20 shows a sectional view taken along line 20—20 of FIG. 15, and FIG. 21 shows a sectional view taken along line 21—21 of FIG. 19.

According to the third embodiment shown in FIG. 19, a movable electrode 84 composed of polycrystalline silicon is formed with two beam portions 79 and 80, a weight 81, and two electrode portions 82 and 83. The beam portions 79 and 80 extend mutually in parallel and linearly. The weight 81 is formed between the beam portions 79 and 80. The electrode portions 82 and 83 protrude from the beam portions 79 and 80 upwardly and downwardly in FIG. 19. Fixed electrodes 86 and 87, and 88 and 89, are formed on a p-type silicon substrate 85 below the electrode portions 82 and 83 of the movable electrode 84 with respect to both sides thereof, respectively.

At the time of formation of the beam structure, an insulation film (not illustrated) is etched as a sacrificial layer, and a gap (interval) 90 is formed by means of this sacrificial layer etching. Accordingly, the movable electrode 84 (polycrystalline silicon) is fixed at anchor portions 91, 92, 93, and 94, and the electrode portions 82 and 83 assume a movable structure.

Additionally, in FIG. 19, electrode portions 95, 96, 97, and 98 are disposed so as to protrude from the weight 81 of the movable electrode 84. A pair of electrodes for movable electrode upward-movement use 99 and 100 opposing the electrode portion 95 are disposed at the same height from the upper surface of the silicon substrate 85. Similarly, electrodes for movable electrode upward-movement use 101 and 102 are disposed with respect to the electrode portion 96, electrodes for movable electrode upward-movement use 103 and 104 are disposed with respect to the electrode portion 97, and electrodes for movable electrode upward-movement use 105 and 106 are disposed with respect to the electrode portion 98.

The electrodes for movable electrode upward-movement use 99 to 106 are formed of the same material as the movable electrode 87, here polycrystalline silicon. The electrodes for movable electrode upward-movement use 99 to 106 are formed simultaneously with the formation of movable electrode 87 by means of machining polycrystalline silicon deposited atop a sacrificial layer, and the heights thereof from the substrate are determined by means of the thickness of the sacrificial layer, and are made constantly equal. Additionally, the electrodes for movable electrode upward-movement use 99 to 106 can be formed only by changing the machining pattern of the polycrystalline silicon, and no additional processes are required to provide the electrodes for movable electrode upward-movement use 99 to 106.

Figure 22:
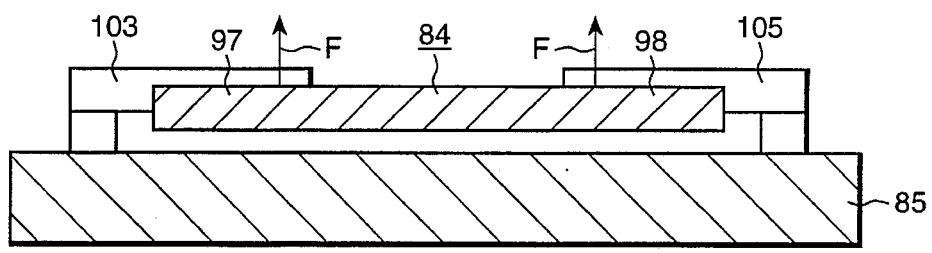
FIG. 22 and 23 are sectional views for explaining an operation of the semiconductor acceleration sensor of the third embodiment.
Figure 23:
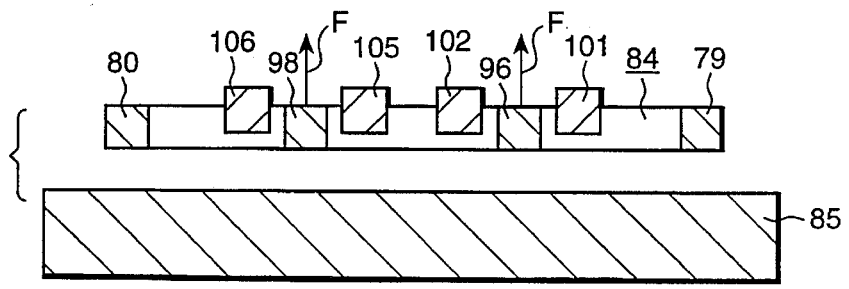

In addition, potential differences are applied between the electrodes for movable electrode upward-movement use 99 to 106 and the electrode portions 95 to 98. As a result of this, attractive force of the movable electrode 84 toward the semiconductor substrate 85 is alleviated. When voltage is applied between the silicon substrate 85 and movable electrode 84 in a state wherein the movable electrode 84 and electrodes for movable electrode upward-movement use 99 to 106 are the same height as shown in FIGS. 20 and 21, electrostatic force is exerted between the silicon substrate 85 and movable electrode 84. Then, as shown in FIGS. 22 and 23, the movable electrode 84 is attracted toward the silicon substrate 85, and the movable electrode 84 moves downwardly. At this time, however, as shown in FIGS. 22 and 23, forces F, which raise the weight 81 of the movable electrode 84, are exerted between the electrode portion 95 and the electrodes for movable electrode upward-movement use 99 and 100, between the electrode portion 96 and the electrodes for movable electrode upward-movement use 101 and 102, between the electrode portion 97 and the electrodes for movable electrode upward-movement use 103 and 104, and between the electrode portion 98 and the electrodes for movable electrode upward-movement use 105 and 106. As a result of this, the sensor structure is not drawn to the substrate.

As described above, according to this embodiment, the electrodes for movable electrode upward-movement use 99 to 106 are disposed at heights equal to the height at which the movable electrode 84 is disposed, and a potential difference is provided between the movable electrode 84 and the electrodes for movable electrode upward-movement use 99 to 106, and attractive force of the movable electrode 84 toward the semiconductor substrate 85 is alleviated. That is to say, when the movable electrode 84 attempts to move downwardly to where the substrate 85 is, a force acts to lift the movable electrode 84 by means of the electrodes for movable electrode upward-movement use 99 to 106. As a result of this, an approaching action due to electrostatic forces between the silicon substrate 85 and movable electrode 84 can be avoided with this new structure, without providing a lower electrode as in FIG. 28.

Further, according to this embodiment, the number of sets of electrodes for movable electrode upward-movement use is four, but other numbers of sets are also acceptable.

(Fourth Embodiment)

Next, a fourth embodiment will be described with a focus on points of difference from the third embodiment. Identical symbols are given to identical structures in the drawings.

Figure 24:
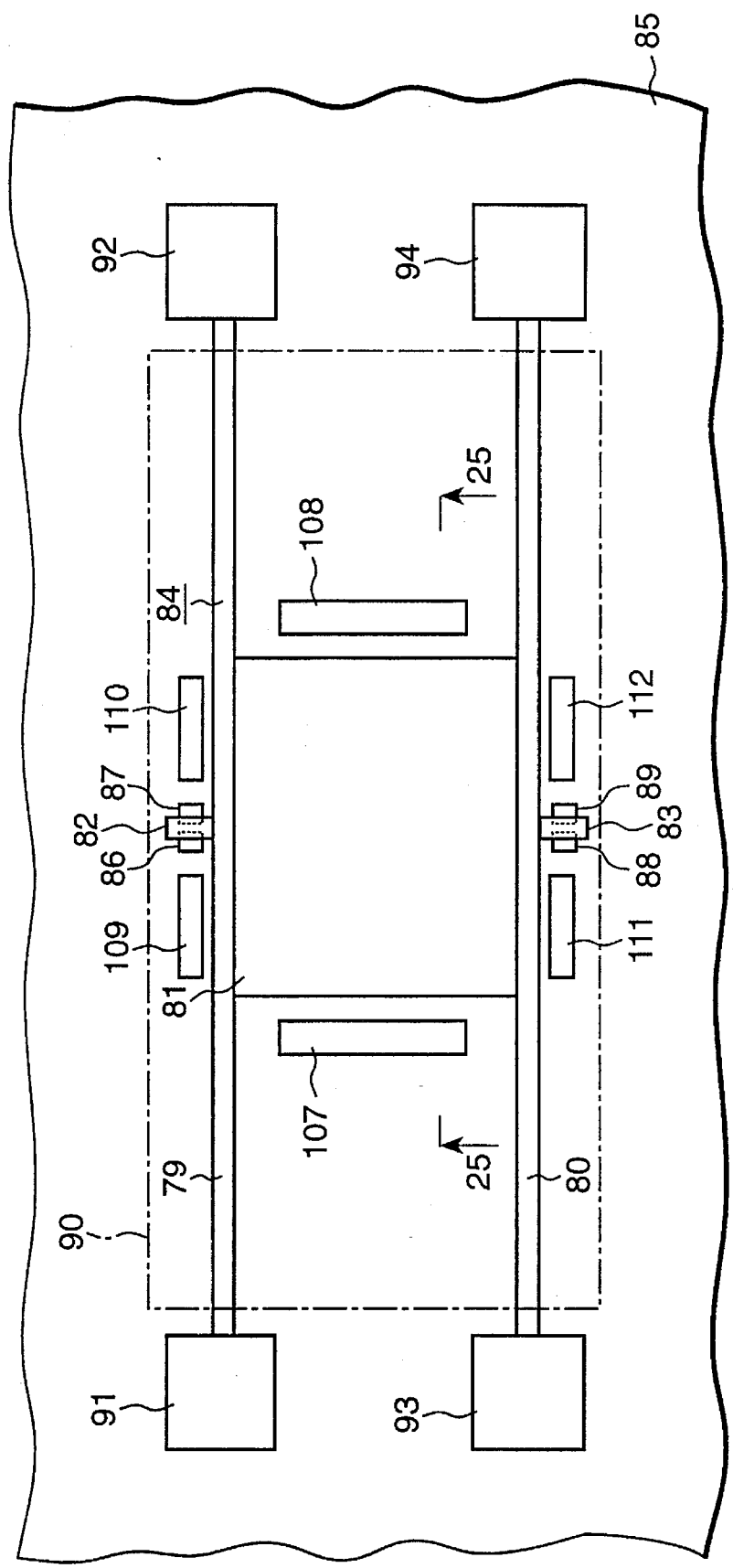
FIG. 24 is a plan view of a semiconductor acceleration sensor according to a fourth embodiment.
Figure 25:
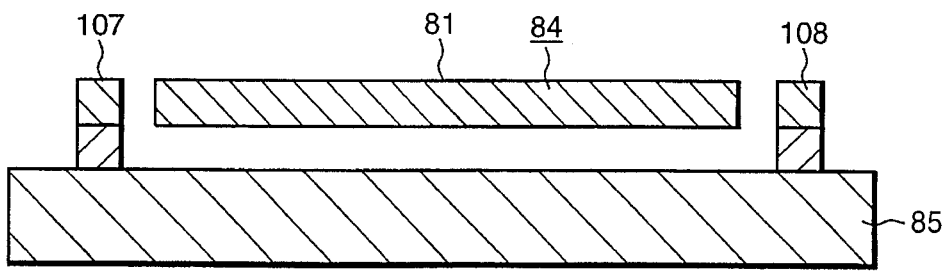
FIG. 25 is a sectional view taken along line 25—25 of FIG. 26.

FIG. 24 shows a plan view of an acceleration sensor according to the fourth embodiment, and FIG. 25 shows sectional view taken along line 25—25 of FIG. 24.

Located at the left-side surface of a weight 81 in movable electrode 84 is an electrode for upward-movement use 107. Electrode 107 is disposed so as to protrude from a silicon substrate 85 and have the same height as the movable electrode 84 and oppose the side surface of the weight 81. Additionally, on the right-side surface of the weight 81 of the movable electrode 84 is an electrode for movable electrode upward-movement use 108. Electrode 108 is disposed so as to protrude from the silicon substrate 85 and so as to have the same height as the movable electrode 84 and oppose the side surface of the weight 81. Further, on the other side surfaces of the weight 81 of the movable electrode 84 (upper and lower positions of FIG. 24), electrodes for movable electrode upward-movement use 109, 110, 111, and 112 are disposed so as to protrude from the silicon substrate 85 and so as to have the same height as the movable electrode 84 and oppose the corresponding side surfaces of the weight 81.

Figure 26:
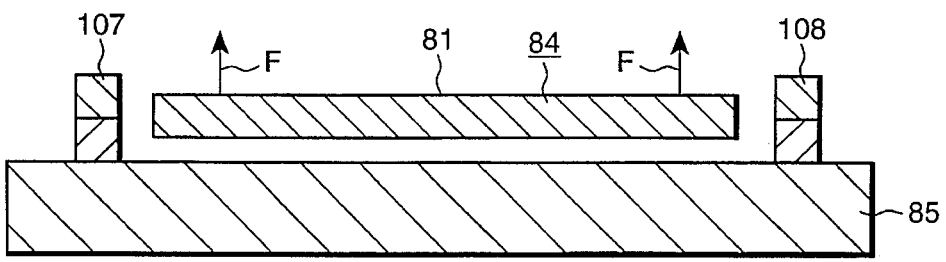
FIG. 26 is a sectional view for explaining an operation of the semiconductor acceleration sensor of the fourth embodiment.
Figure 27:
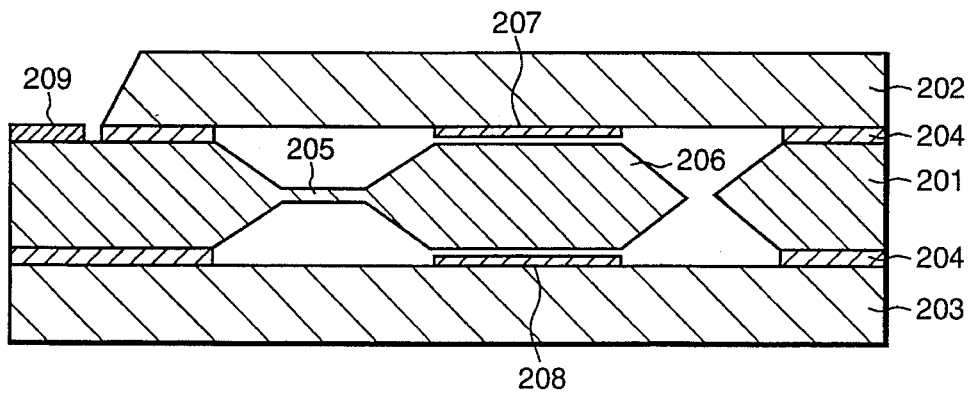
FIG. 27 is a sectional view of a semiconductor acceleration sensor of prior art.

In addition, potential differences are applied between the electrodes for movable electrode upward-movement use 107 to 112 and the movable electrode 84. As a result, the attractive force of the movable electrode 84 toward the semiconductor substrate 85 is alleviated. That is to say, when voltage is applied between the silicon substrate 85 and movable electrode 84 in a state where the movable electrode 84 and electrodes for movable electrode upward-movement use 107 to 112 are the same height as is shown in FIG. 25, an electrostatic force is exerted between the silicon substrate 85 and movable electrode 84. Due to this, as shown in FIG. 26, the movable electrode 84 is drawn toward the silicon substrate 85, and the movable electrode 84 moves downwardly. At this time, however, as shown in FIG. 26, forces F, which tend to raise the weight 81 of the movable electrode 84, are exerted between the movable electrode. 84 and the electrodes for movable electrode upward-movement use 107 and 112. As a result, the approaching action due to electrostatic force between the silicon substrate 85 and movable electrode 84 can be avoided.

It is preferable that the electrodes for movable electrode upward-movement use 107 to 112 might be formed on the same insulation film as an insulation film acting as a sacrificial layer. This is because the movable electrode 84 and weight 81 are all formed on the sacrificial layer, and if the electrodes for movable electrode upward-movement use 107 to 112 are formed on the above-mentioned sacrificial layer, the heights of these can easily be made to be the same height. However, the sacrificial layer below the electrodes for movable electrode upward-movement use 107 to 112 is masked with a photoresist or the like so that it is not etched off during sacrificial layer etching.

(Fifth Embodiment)

There may be some cases where the horizontal plane size of the weight of the movable electrode becomes larger than that of the beam portion (for example, embodiments shown in FIG. 19 and FIG. 24). In this case, at the time of sacrificial layer etching to make the movable electrode displaceable with respect to the substrate, differences between the weight and the beam portion, in time required for sacrificial layer etching may be produced. That is to say, the etching of the sacrificial layer located at the lower part of the weight may take much more time with respect to the etching of the sacrificial layer located at the lower part of the beam portion. This raises problems in that time is required to make the movable electrode movable, and that, at the anchor portion fixing the beam to the substrate, the insulation film of the lower portion thereof is also etched. In addition, it is also believed that etching also progresses with respect to the insulation film below the electrodes for movable electrode upward-movement use 99 to 112 disposed proximate to the movable electrode 84 in FIG. 19 and FIG. 24.

An embodiment, which can make the movable electrode movable with a uniform etching time such that the etching time during sacrificial layer etching is controlled and no fluctuations in etching time are produced, will be described below.

Figure 34:
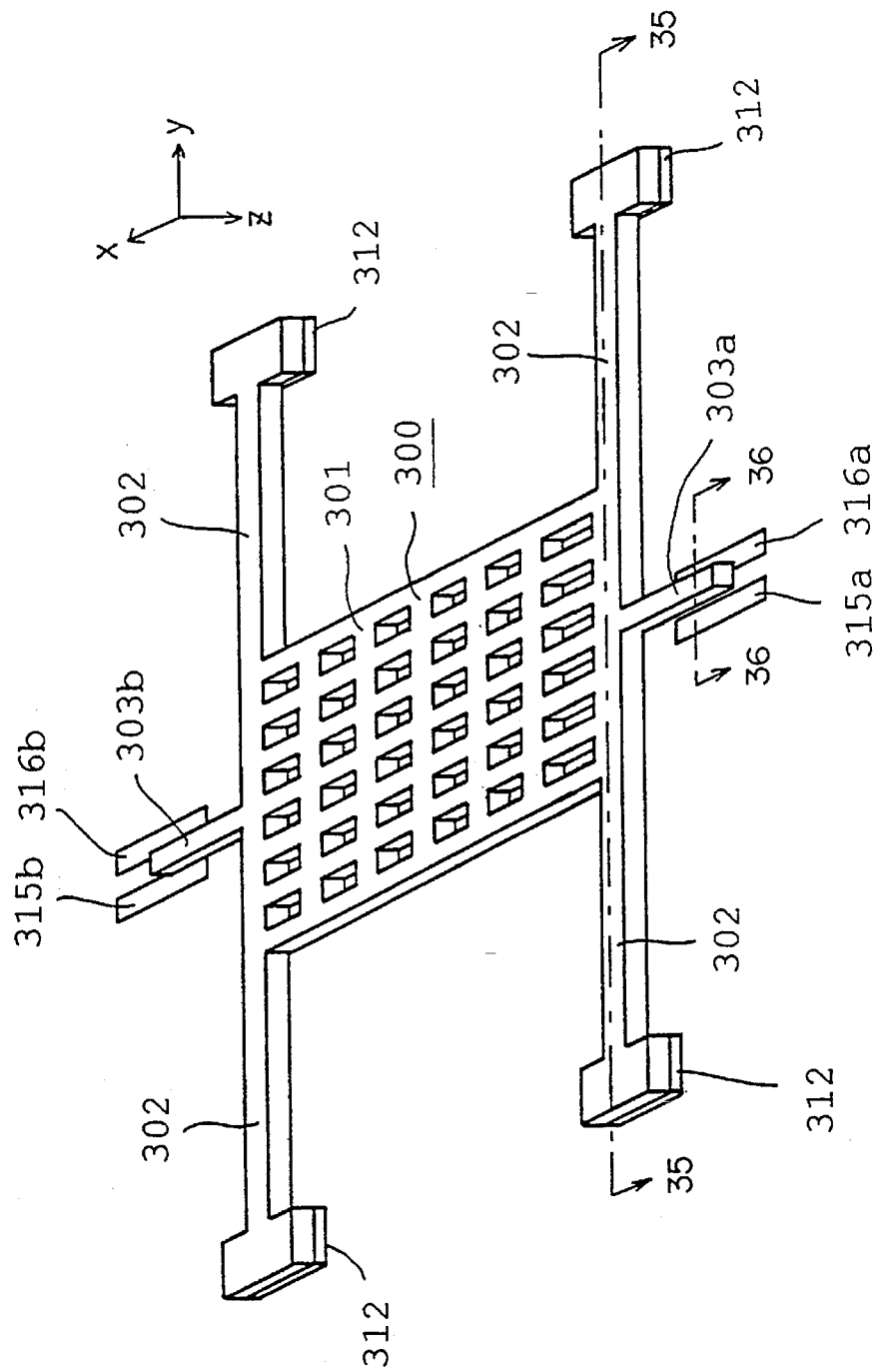
FIG. 34 is a perspective view of a semiconductor acceleration sensor according to a fifth embodiment.

FIG. 34 shows an MISFET semiconductor acceleration sensor according to a fifth embodiment of the present invention. A movable electrode 300 in FIG. 34 is composed of weight 301 formed in a lattice configuration, four beam portions 302 supporting the weight 300, and gate electrode portions 303a and 303b. Additionally, the beam portions 302 are fixed on a p-type silicon substrate 310 via an insulation film 312.

Figure 35:
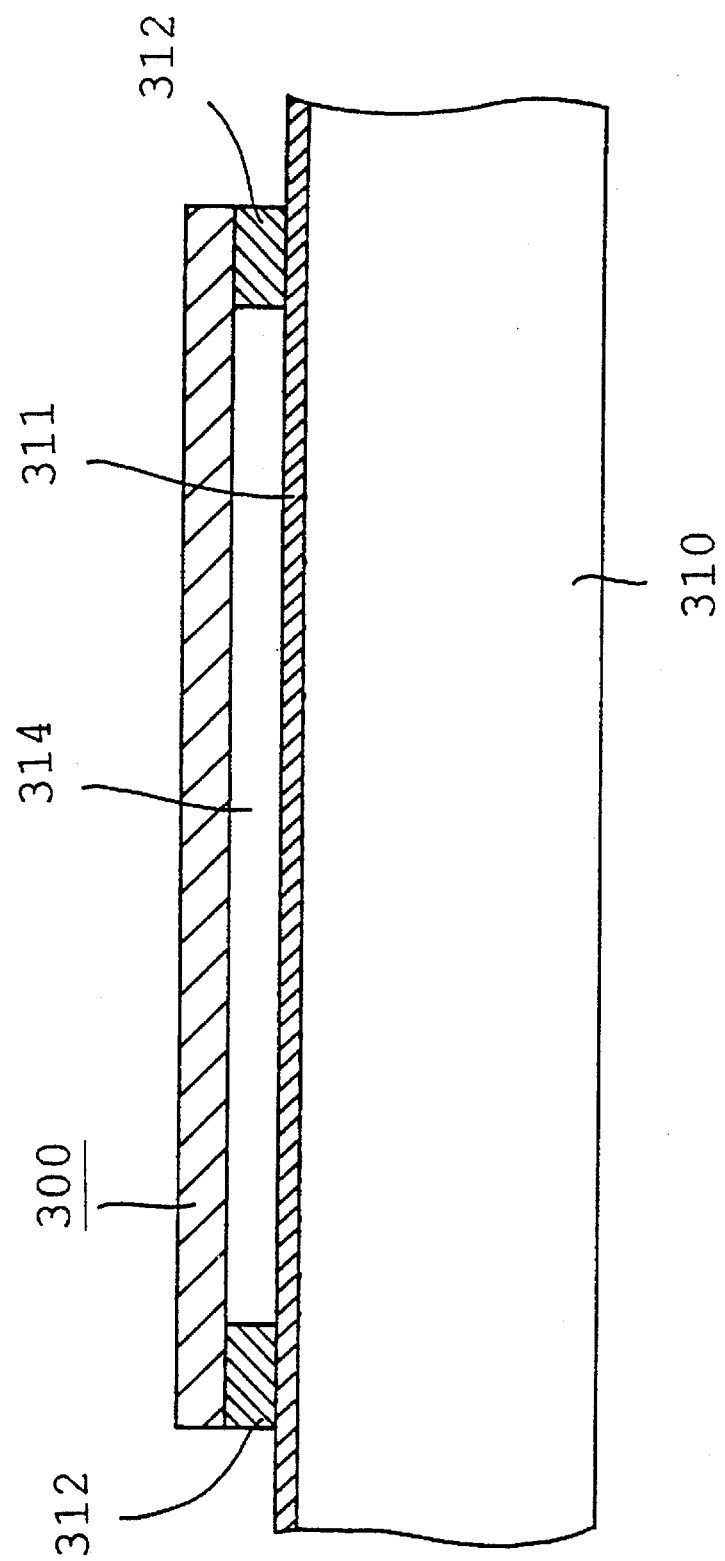
FIG. 35 is a sectional view taken along line 35—35 of FIG. 34.
Figure 36:
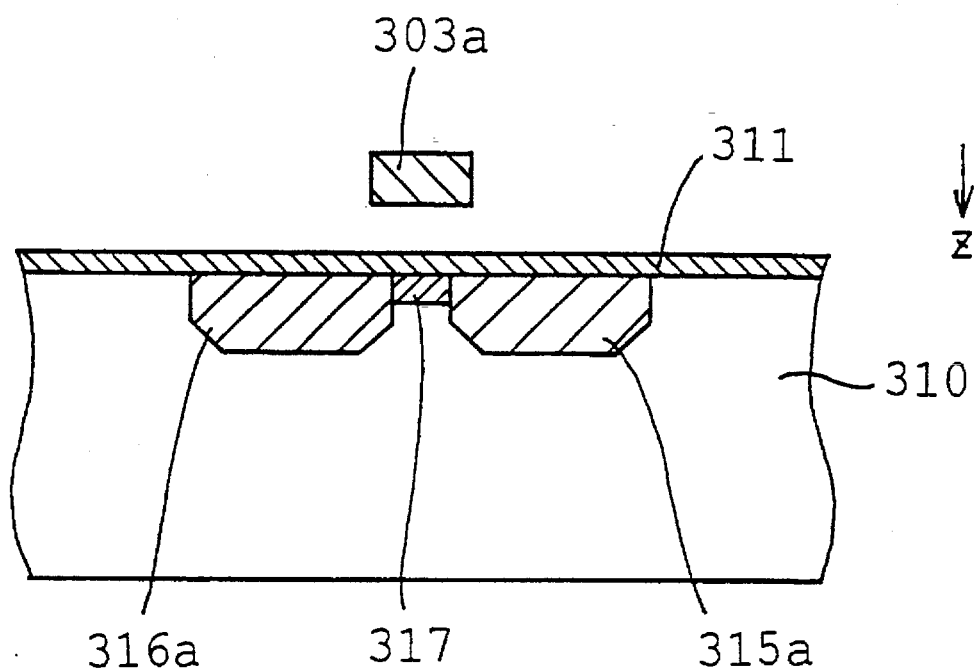
FIG. 36 is a sectional view taken along line 36—36 of FIG. 34.

FIG. 35 shows a sectional view taken along line 35—35 of FIG. 34, and FIG. 36 shows a sectional view taken along line 36—36 of FIG. 34. As shown in FIG. 35, a gate insulation film 311 is formed over the entire main surface of the p-type silicon substrate 310, and thereabove is formed an insulation film 312. Here, the gate insulation film 311 restrains leakage current on the substrate surface as well as suppresses deterioration in transistor characteristics that occur over time. The gate insulation film 311 and insulation film 312 are composed of silicon dioxide, silicon nitride, or the like. Additionally, a region without the insulation film 312, i.e., a gap (interval) 314, is defined in the p-type silicon substrate 310. The movable electrode 300 having a doubly supported beam structure is disposed on the gate insulation film 311 via the insulation film 312 so as to span the gap 314. That is to say, by means of the gap 314, the movable electrode 300 is displaceable with respect to the silicon substrate 310. The movable electrode 300 is composed of polycrystalline silicon, and the electrode portions 303a and 303b thereof function as gate electrodes of MISFET structure.

Additionally, as shown in FIG. 36, fixed electrodes 315a and 316a (315b and 316b), which are composed of impurity diffusion layers and become source/drain regions of a sensor portion, are formed on both sides below the gate electrode portions 303a (303b). These fixed electrodes 315a and 316a (315b and 316b) are formed by means of introducing n-type impurities into the p-type silicon substrate 310 by means of ion implantation or the like. According to this embodiment, phosphorus (P), arsenic (As), and the like are introduced at $10^{19}$ to $10^{20}$ cm$^{-3}$.

In this manner, according to this embodiment, a field-effect transistor (MISFET) is formed with the fixed electrodes 315a and 316a (315b and 316b), the movable electrodes 303a (303b), gate insulation film 311 and gap 314. Consequently, when voltage is applied between the movable electrode 300 and the fixed electrodes 315a and 316a (315b and 316b), a channel region 317 is formed between the fixed electrodes 315a and 316a (315b and 316b) on the p-type silicon substrate 310, and so drain current flows between the fixed electrodes 315a and 316a (315b and 316b).

In addition, although it is not illustrated in FIG. 34 or FIG. 35, electrodes for movable electrode upward-movement use for the purpose of alleviating attractive force of the movable electrode to the substrate are disposed with respect to the movable electrode 300 so as to oppose an upper portion or side surface thereof, as was indicated and described for the above-described first through fourth embodiments. For example, the electrodes for movable electrode upward-movement use 107 to 112 shown in the fourth embodiment of FIG. 24 can be applied. By means of these electrodes for movable electrode upward-movement use, as was described above, electrostatic forces generated between the p-type silicon substrate 310 and movable electrode 300 are suppressed.

Furthermore, the gap 314 defined in the insulation film 312 on the lower portion of the movable electrode 300 is formed by means of forming an insulation film as a sacrificial layer on the entire surface on the gate insulation film 311, and thereafter performing etching such that a portion of the insulation film 312 is allowed to remain. During this sacrificial layer etching, an etching liquid which etches only the insulation film as the sacrificial layer without etching the movable electrode 300 and the gate insulation film 311 which protects the substrate surface is used. For example, it is acceptable to employ a silicon nitride film as the gate insulation film 311, a silicon dioxide film as the sacrificial layer 312, and a hydrofluoric etching liquid.

Here, as shown in FIG. 34, the weight 301 of the movable electrode 300 is formed in a lattice configuration, and the width of each lattice is formed so as to be the same width as the beam portions 302 (approximately 4 µm). As described above, in a case where the movable electrode 300 is formed, the gate insulation film 311 is formed on the p-type silicon substrate 310, an insulation film which is a sacrificial layer is next formed thereabove, and after forming the movable electrode 300, the gap 314 is formed by means of etching. At that time, however, by making the weight 301 into a lattice configuration as in this embodiment, the lower part of weight 301 can be etched during the same time that the beam portions 302 are made movable, and the entire movable electrode 300 can be made movable in the same time. Additionally, in a case where width of weight in the lattice configuration is not made identical to the beam portions, it is effective to make the width of each lattice to be the minimum dimension of these beam portions. Consequently, etching can be completed in the minimum required time, and productivity can be improved.

Moreover, the width of the gate electrode portions 303a (303b) is not limited by the width of the beam portions 302, but due to the above-mentioned etching progression speed, it is preferable that it might be set substantially the same as the width of the beam portions 302. In this case, it is also acceptable to increase or decrease the distance between the fixed electrodes 315a and 316a (315b and 316b). Here, current flow is facilitated in accordance with the decreases in distance between fixed electrodes, and so smaller circuits can be achieved.

Furthermore, the width of the beam portions 302 of the movable electrode 300 and the lattice width of the weight 301 are not exclusively limited to the values according to this embodiment, and the values thereof may be increased or decreased in accordance with the magnitude of the acceleration to be detected and the desired strength of the movable electrode 300. Additionally, for an acceptable material as well for these components, it is acceptable to employ, aside from polycrystalline silicon, a metal with a high melting point such as tungsten.

Next, the operation of the semiconductor acceleration sensor structured in the foregoing configuration will be described briefly. When voltage is applied between the movable electrode 300 and the p-type silicon substrate 310 and between the fixed electrodes 315a and 316a (315b and 316b), a channel region 317 is formed and current flows between the fixed electrodes 315a and 316a (315b and 316b). Here, in a case where this acceleration sensor is subjected to acceleration and the movable electrode 300 is displaced in the Z direction (direction perpendicular to the substrate) indicated in FIG. 34, the carrier concentration in the channel region 317 increases by means of change in electrical field intensity, and current increases. Additionally, in a case where this acceleration sensor is subjected to acceleration and is displaced in the X direction (horizontal direction of the substrate) indicated in FIG. 34, current flowing between the fixed electrodes 315*a* and 316*a* increases by means of a change in the surface area of the channel region 317 overlapping with the gate electrode portion 303*b*, and the current flowing between the fixed electrodes 315*b* and 316*b* conversely decreases. As described above, this acceleration sensor can detect acceleration of two dimensions by means of the magnitude and phase of current changes between fixed electrodes 315*a* and 316*a* and current changes between fixed electrodes 315*b* and 316*b*.

Here, as shown in FIG. 34, in the acceleration sensor according to the fifth embodiment, the movable electrode 300 is supported by four beam portions 302. Consequently, the relationship between the movable electrode 300 and p-type silicon substrate 310 can constantly be maintained in parallel, even in a case where upward, downward, leftward, or rightward acceleration is applied to the movable electrode 300. That is to say, torsion of the movable electrode is prevented. Accordingly, the change in current flowing between the fixed electrodes 315*a* and 316*a* (315*b* and 316*b*) can be made to be the desired value, and extremely accurate acceleration detection can be performed.

(Sixth Embodiment)

Figure 37:
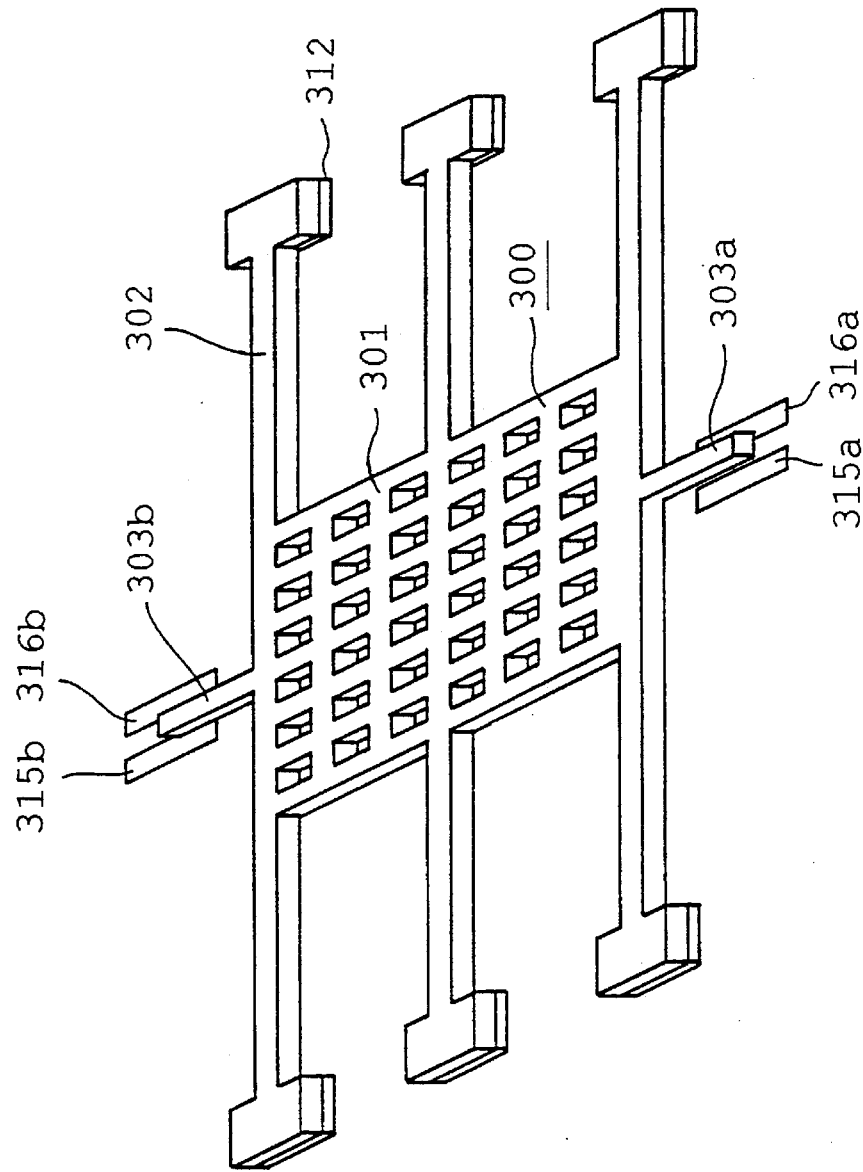
FIG. 37 is a perspective view of a semiconductor acceleration sensor according to a sixth embodiment of the present invention.

A sixth embodiment according to the present invention will be described next with reference to the drawings. FIG. 37 shows a semiconductor acceleration sensor according to the sixth embodiment. A movable electrode 300 in FIG. 37 is composed of gate electrode portions 303*a* and 303*b* and a weight 301 and six beam portions 302 supporting the weight 301. Incidentally, other structures are identical to those indicated in FIG. 34, respectively. Consequently, an acceleration sensor according to this embodiment, similar to the acceleration sensor according to the fifth embodiment, can also constantly maintain the movable electrode 300 and p-type silicon substrate 310 in parallel. Accordingly, the change in current flowing between the fixed electrodes 315*a* and 316*a* (315*b* and 316*b*) can be made to be the desired value, and extremely accurate acceleration detection can be performed.

Additionally, similarly to FIG. 34, electrodes for movable electrode upward-movement use are not illustrated.

(Seventh Embodiment)

Figure 38:
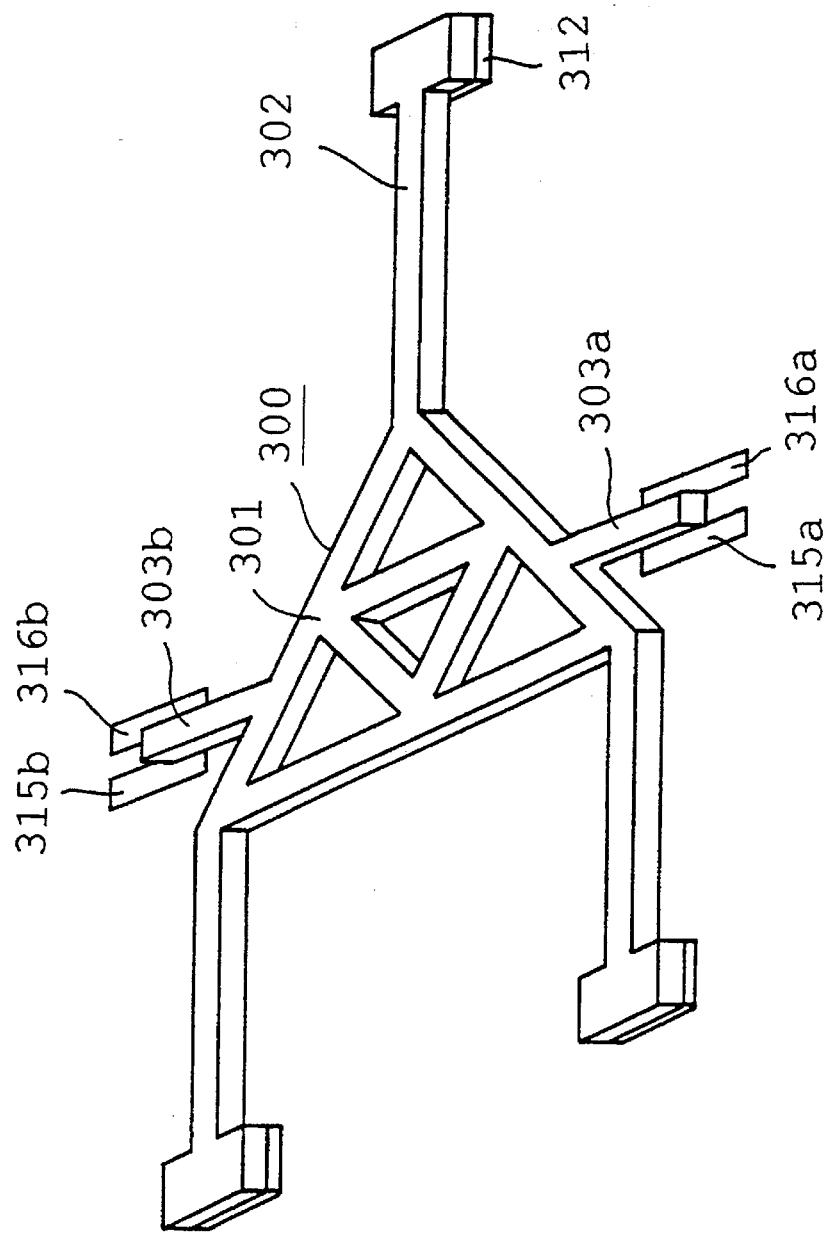
FIG. 38 is a perspective view of a semiconductor acceleration sensor according to a seventh embodiment of the present invention.

FIG. 38 shows a semiconductor acceleration sensor according to a seventh embodiment of the present invention. A movable electrode 300 in FIG. 38 is composed of gate electrode portions 303*a* and 303*b*, a weight 301, and three beam portions 302 supporting the weight 301; in other respects the structure is identical to that indicated in FIG. 34. Consequently, an acceleration sensor according to this embodiment, similar to the acceleration sensor according to the fifth embodiment, can also constantly maintain the movable electrode 300 and p-type silicon substrate 310 in parallel. Accordingly, the change in current flowing between the fixed electrodes 315*a* and 316*a* (315*b* and 316*b*) can be made to be the desired value, and extremely accurate acceleration detection can be performed.

Additionally, similar to FIG. 34, for this embodiment as well, electrodes for movable electrode upward-movement use are not illustrated.

(Eighth Embodiment)

Figure 39:
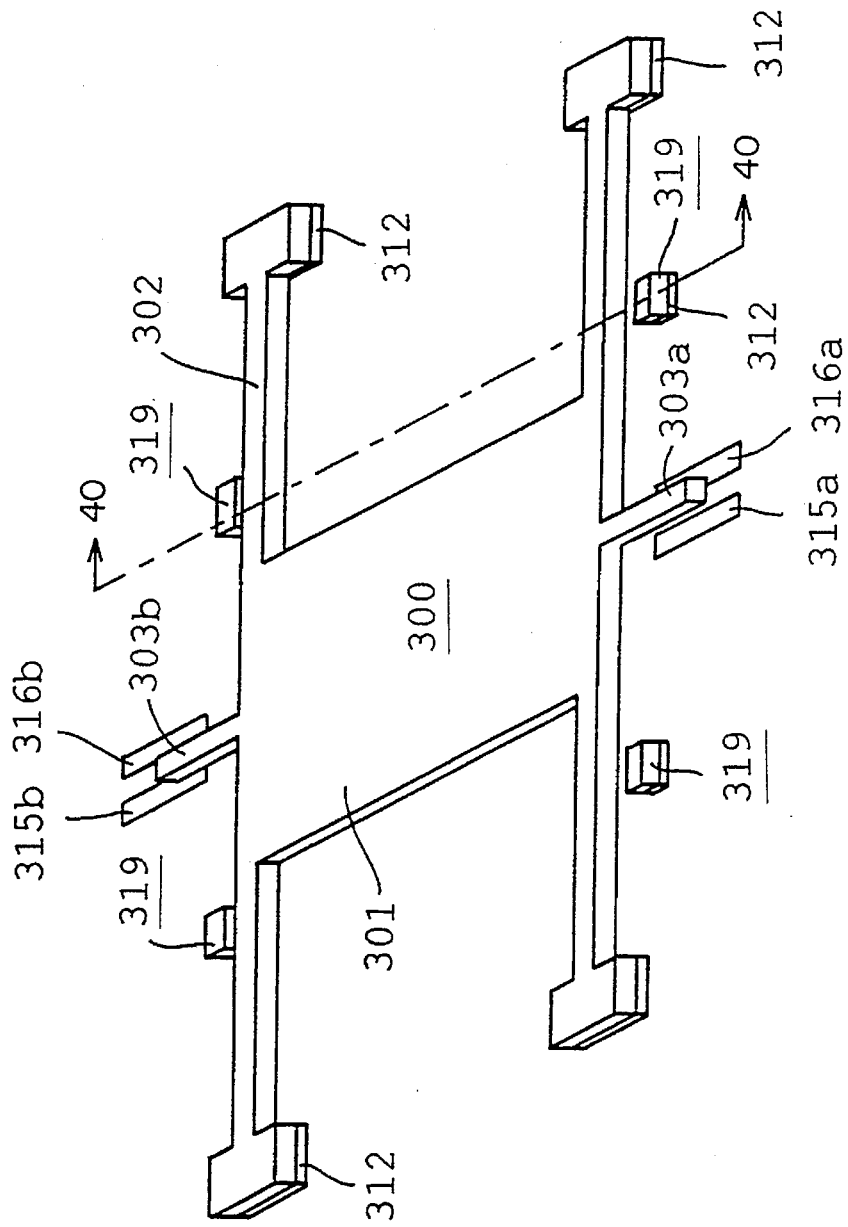
FIG. 39 is a perspective view of a semiconductor acceleration sensor according to an eighth embodiment of the present invention.
Figure 40:
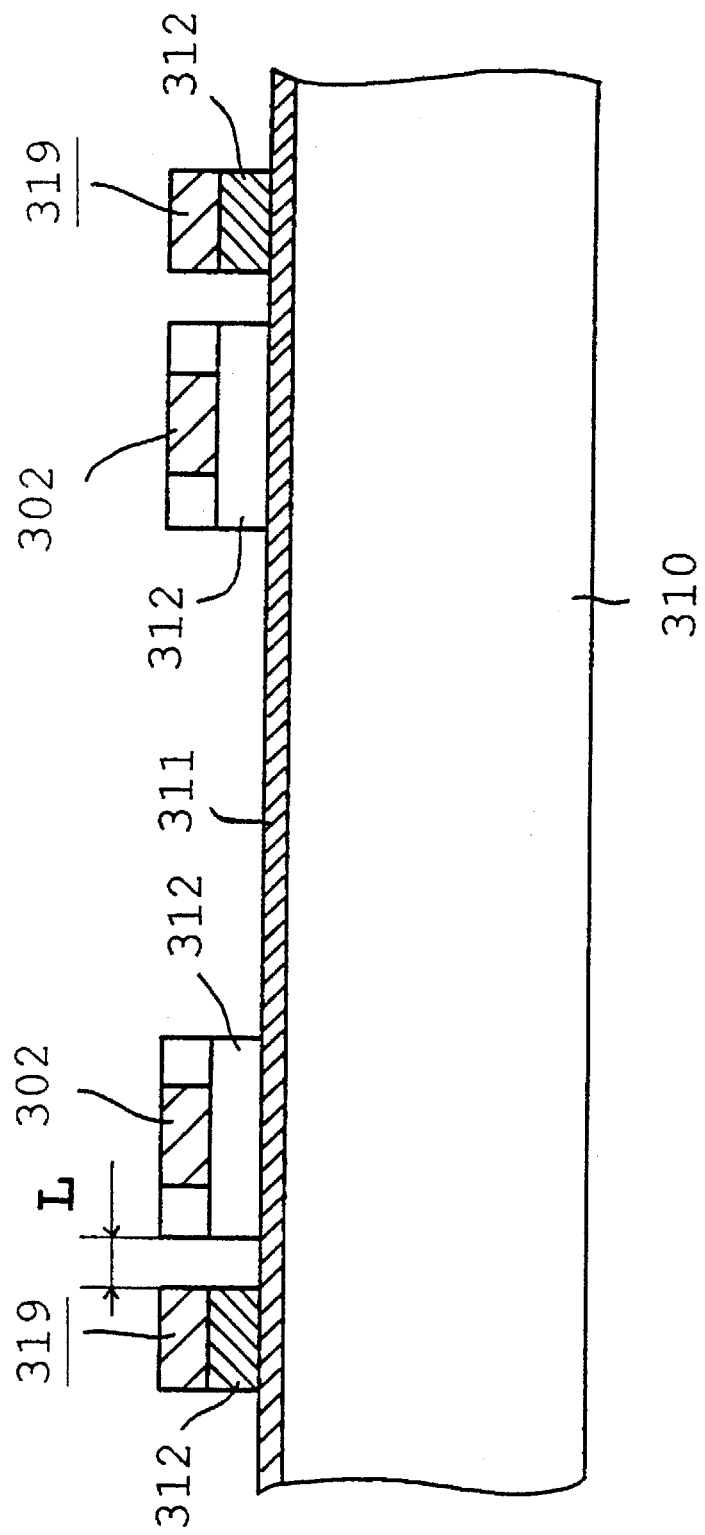
FIG. 40 is a sectional view taken along line 40—40 of FIG. 39.

An eighth embodiment according to the present invention will be described next with reference to the drawings. FIG. 39 shows a semiconductor acceleration sensor according to the eighth embodiment, and FIG. 40 shows a sectional view taken along line 40—40 of FIG. 39. In addition, the present embodiment is an improved structure over the fourth embodiment indicated in FIG. 24.

In FIG. 34, a movable electrode 300 is formed of a weight 301, four beam portions 302 supporting the weight 301, and gate electrode portions 303*a* and 303*b*. The beam portions 302 are fixed on a p-type silicon substrate 310 via an insulation film 312. Additionally, side stoppers 319 are disposed on the p-type silicon substrate 310 at a specified interval L from the beam portions 302 of the movable electrode 300. Moreover, electrodes for movable electrode upward-movement use 107 to 112 of FIG. 24 are not illustrated, but these electrodes for movable electrode upward-movement use 107 to 112 can, of course, be also used as side stoppers 319 of this embodiment.

As shown in FIG. 40, the side stoppers 319 are formed on the insulation film 312 so as to be spaced apart from the beam portions 302 by a specified interval L. Here, the side stoppers 319 are formed simultaneously by means of patterning the identical material when forming the movable electrode 300. However, it is also acceptable to form stoppers 319 by gluing another angular material with adhesive or the like, without formation simultaneously with the movable electrode 300.

In an acceleration sensor according to this embodiment, the movable range of the movable electrode 300 can be restricted by means the side stoppers 319. Consequently, there is no breakage or bending of the beam portions 302 even if sudden large acceleration is applied horizontally with respect to the movable electrode 300. Accordingly, durability is excellent, and constantly stabilized and accurate acceleration detection can be performed. Additionally, as described above, the side stoppers 319 according to this embodiment are formed simultaneously in the process of forming the movable electrode 300, and so there is no need to add a special step for the purpose of forming the side stoppers 319. In addition, a range of detectable acceleration can be established easily by adjusting the interval L.

Figure 41:
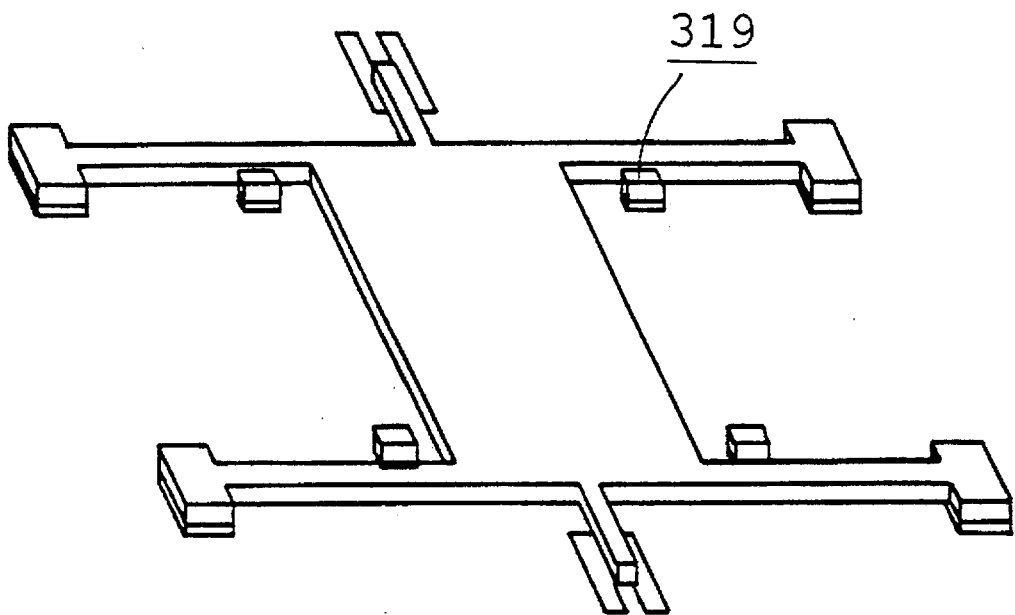
FIG. 41 through FIG. 44 are perspective views, each indicating a modification of the eighth embodiment.
Figure 42:
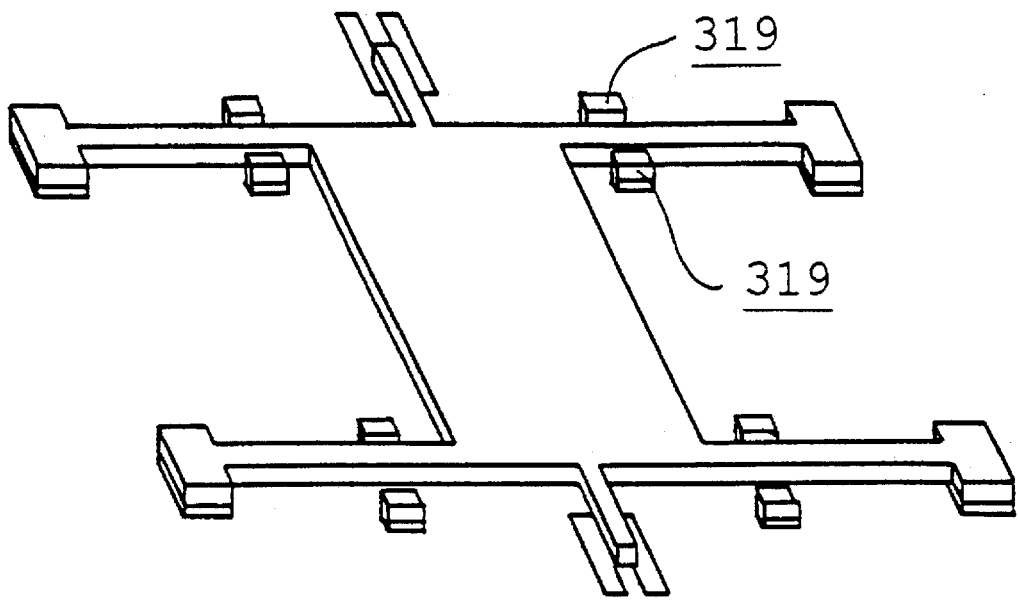
Figure 43:
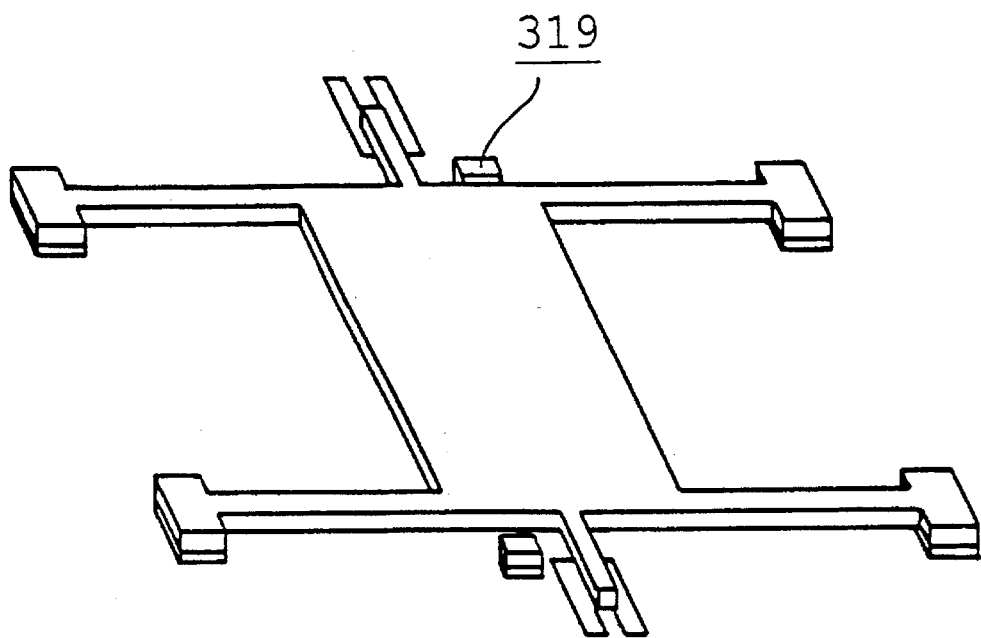
Figure 44:
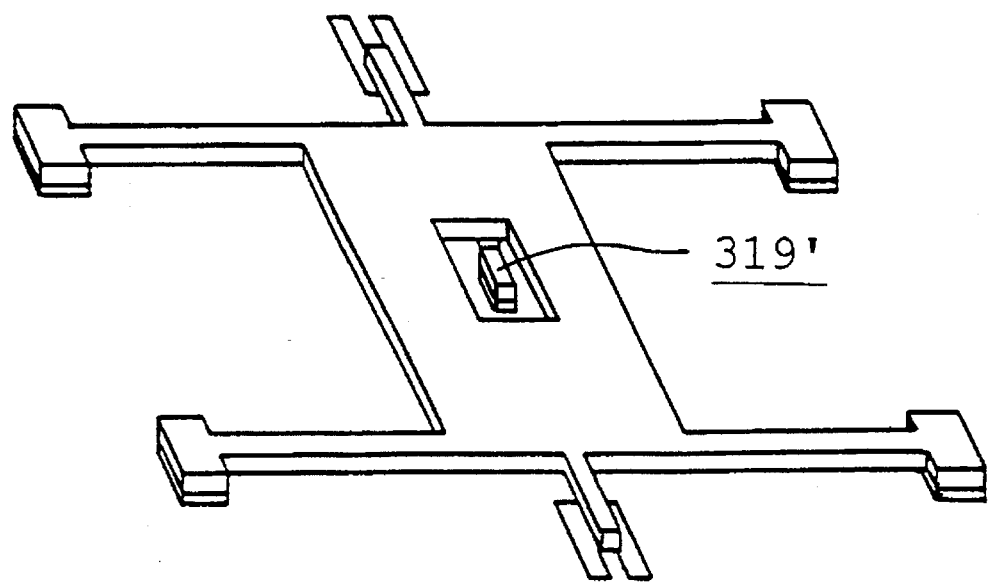

Moreover, in FIG. 39, the side stoppers 319 are formed one each (a total of four) in the proximity of the outer sides of the respective beam portions 302. However, it is acceptable to modify the locations and number to be formed as desired. It is acceptable, for example, to form one each (a total of four) in the proximity of the inner sides of four beam portions as shown in FIG. 41, to form one each (a total of eight) on the inner and outer sides as shown in FIG. 42, or to form one each (a total of two) in the directions of displacement of the movable electrode 300 as shown in FIG. 43. In addition, similar effects can be obtained even if a center stopper 319' is formed within the weight 301 as shown in FIG. 44, without disposing side stoppers 319 proximate to the beam portions.

Furthermore, the side stoppers 319 are not exclusively formed on the insulation film 312 as shown in FIGS. 41 to 44, similar effects can be obtained even if formed directly on the substrate.

Moreover, it is also acceptable to form a hole in the weight of the movable electrode for the purpose of sacrificial layer etching, in the manner of the foregoing fifth through seventh embodiments.

(Ninth Embodiment)

Figure 45:
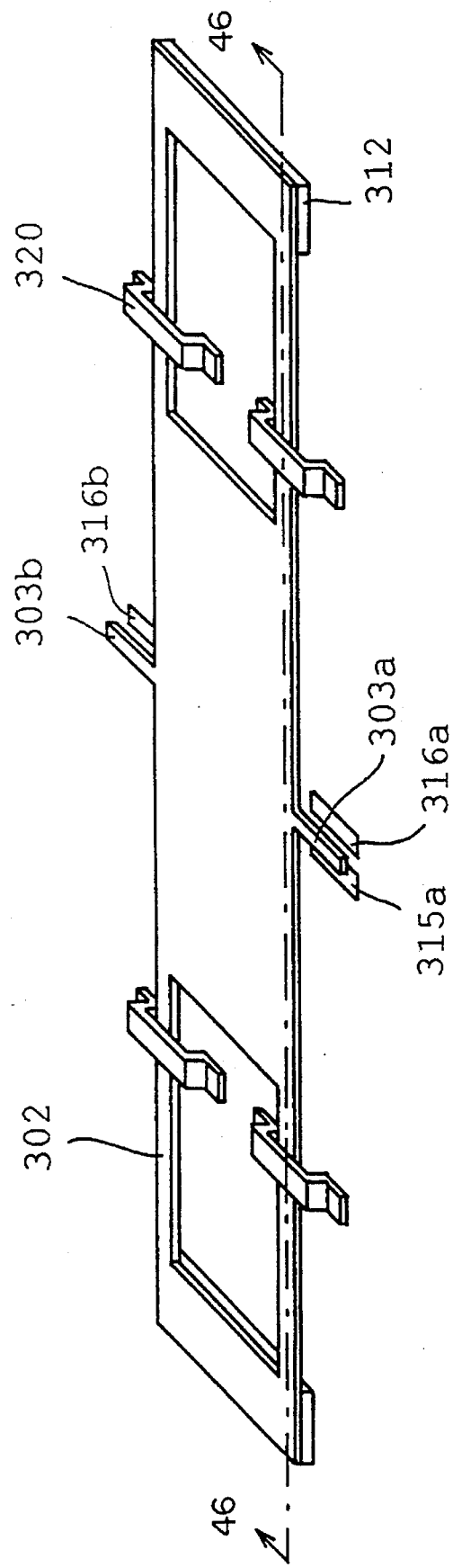
FIG. 45 is a perspective view of a semiconductor acceleration sensor according to a ninth embodiment of the present invention.
Figure 46:
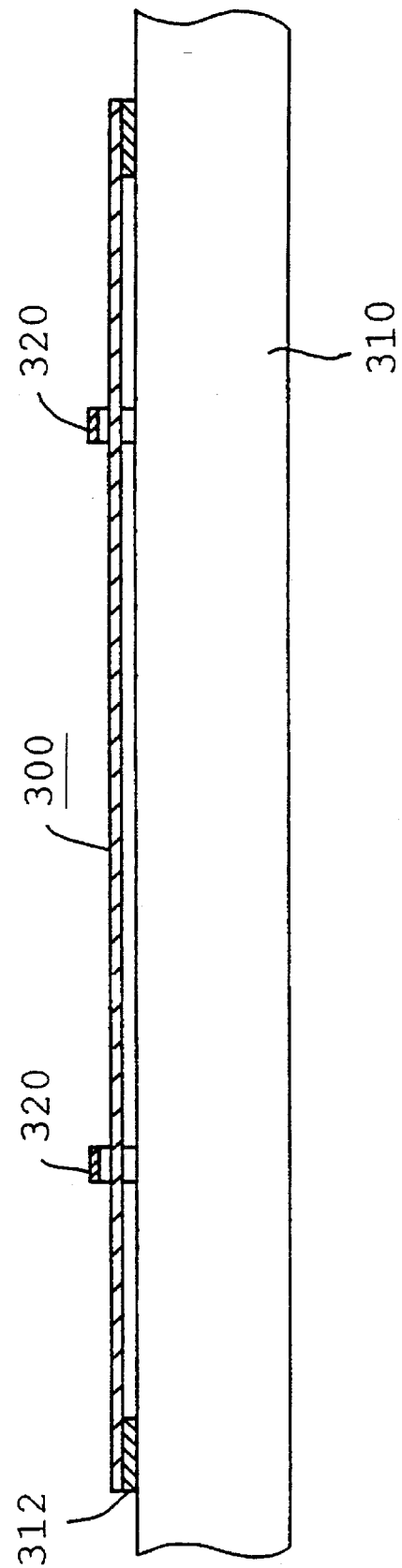
FIG. 46 is a sectional view taken along line 46—46 of 45.

A ninth embodiment according to the present invention will be described next with reference to the drawings. FIG. 45 shows a semiconductor acceleration sensor according to the ninth embodiment, and FIG. 46 shows a sectional view taken along line 46—46 of FIG. 45. In addition, the present embodiment has an improved structure over that of the fourth embodiment electrodes for movable indicated in FIG. 24. However, electrode upward-movement use 107 to 112 of FIG. 24 are not illustrated.

In FIG. 45, a bridge 320 is formed on each of four 320 are formed after beam portions 302. These bridges forming the movable electrode 300 by using a semiconductor fabrication process. Here, the material of the bridges 320 can be formed of a metal such as aluminum, a semiconductor such as silicon, an oxide film such as silicon oxide, a nitride such as silicon nitride, and so on. In addition, the bridges 320 are disposed to have a specified interval from the beam portions 302 in the horizontal and perpendicular directions thereof. FIG. 46 shows the interval in the perpendicular direction.

In an acceleration sensor according to this embodiment, the movable range of the movable electrode 300 can be restricted by means of providing the bridges 320. Consequently, there is no breakage or bending of the beam portions 302 even if sudden large acceleration is applied not only horizontally but also perpendicularly with respect to the movable electrode 300. Accordingly, durability is excellent, and constantly stabilized and accurate acceleration detection can be performed.

Figure 47:
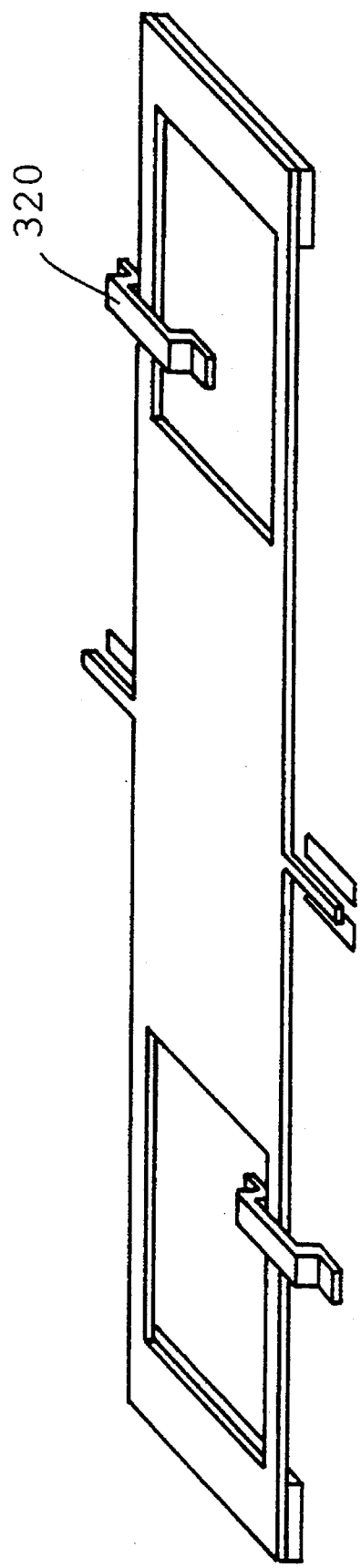
FIG. 47 and FIG. 48 are perspective views, each indicating a modification of the ninth embodiment.
Figure 48:
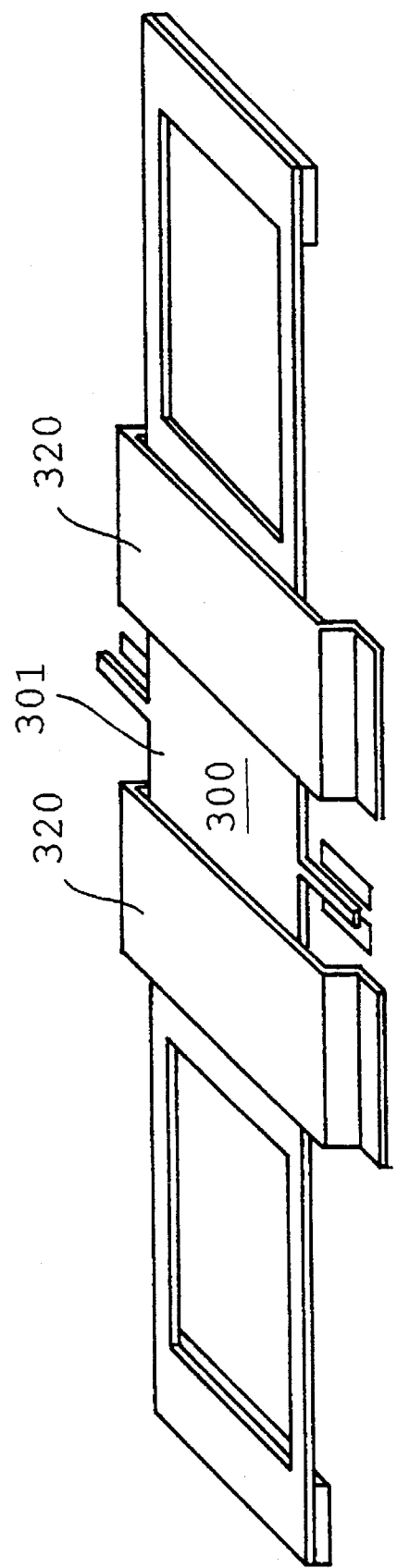

Moreover, the configuration, structural location, number, and the like for the bridges 320 according to this embodiment can be modified as desired. It is acceptable, for example, to establish only two locations as shown in FIG. 47, or to establish a structure which covers the entirety of the weight 310 as shown in FIG. 48. In this case, if the bridges 320 are made conductive or structured with an electrode portion so that a potential difference with the movable electrode 300 is given, it is also possible to use these bridges 320 as electrodes for movable electrode upward-movement use similar to the first and second embodiments.

In addition, it is not necessary to make the bridges 320 exclusively a square-C configuration. It is also acceptable, for example, to adopt an inverted U, inverted V, inverted J, inverted L, or T configuration. Additionally, the method of formation of the bridges 320 is not exclusively a semiconductor process, it is also acceptable to cause formation by gluing a member with adhesive or the like after formation of the movable electrode 300.

Furthermore, combination with the above-described fifth or sixth embodiments is also possible.

(Tenth Embodiment)

Figure 49:
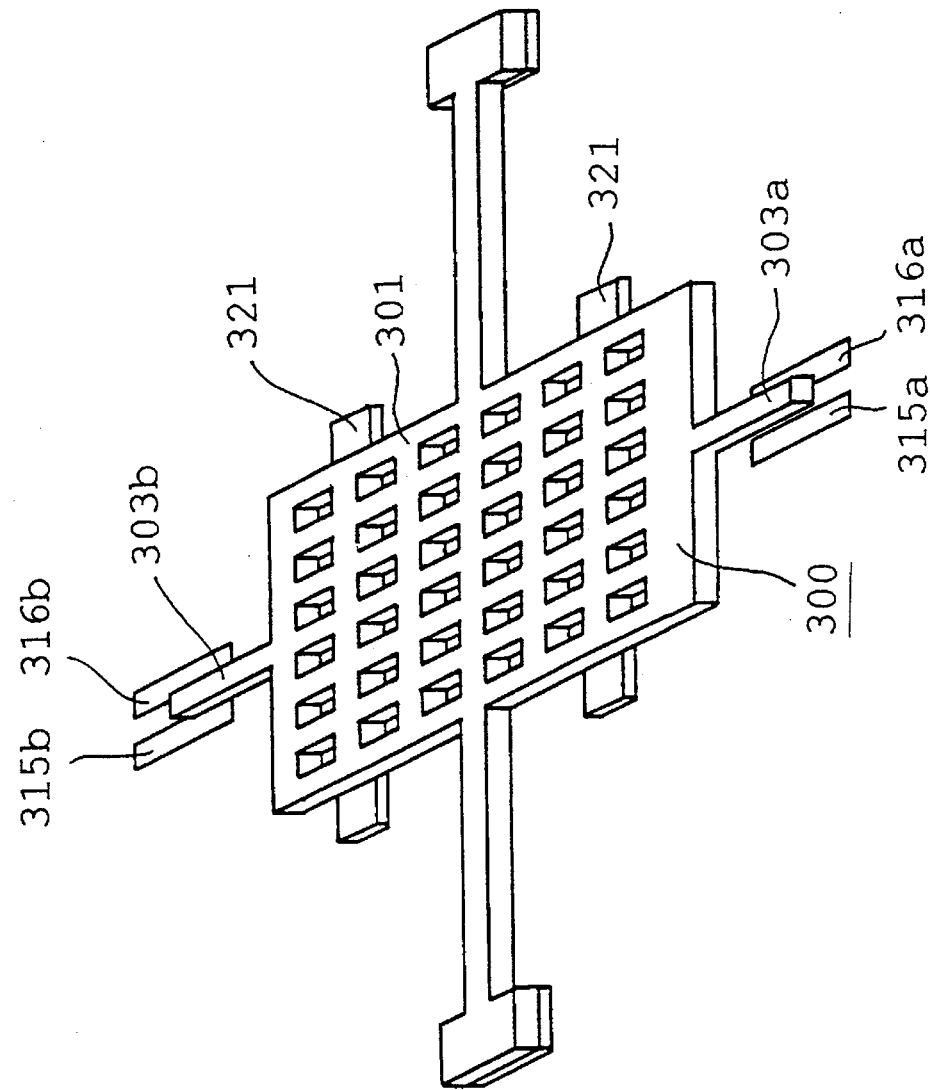
FIG. 49 is a perspective view of a semiconductor acceleration sensor according to a tenth embodiment of the present invention.

A tenth embodiment according to the present invention will be described next with reference to the drawings. FIG. 49 shows a semiconductor acceleration sensor according to the tenth embodiment. The electrodes for movable electrode upward-movement use according to the above-described first through fourth embodiments are not illustrated.

In FIG. 49, a movable electrode 300 is composed of a weight 301, two beam portions 302 supporting the weight 301, and gate electrode portions 303a and 303b. Additionally, the beam portions 302 are fixed on a p-type silicon substrate 310 via an insulation film 312. In addition, torsion stoppers 321 to prevent torsion or the movable electrode 300 are formed between the movable electrode 300 and the p-type silicon substrate 310.

With this structure, the movable electrode 300 detects acceleration in the horizontal direction of the p-type silicon substrate 310. At this time, vertical torsion of the movable electrode 300 can be prevented because the torsion stoppers 321 are present. Consequently, an acceleration sensor according to this embodiment, similarly to an acceleration sensor according to the fifth embodiment, can also constantly maintain the movable electrode 300 and p-type silicon substrate 310 in parallel. Accordingly, the fluctuation in current flowing between the fixed electrodes 315a and 316a (315b and 316b) can be reduced, and extremely accurate acceleration detection can be performed. In addition, according to this embodiment, acceleration detection of even greater precision is possible by means of installing the side stoppers 319 indicated in FIG. 39 or the bridges 320 indicated in FIG. 45.

This invention employing a semiconductor acceleration sensor using a p-type silicon substrate has been described according to the foregoing various embodiments, but conversely it is also acceptable to use an n-type silicon substrate. In that case, it is acceptable to use boron (B) for the dopant to be doped as the fixed electrodes. Additionally, the semiconductor substrate itself as well is not exclusively silicon, it is also acceptable to employ another semiconductor substance. Moreover, this invention is not exclusively an acceleration sensor to detect acceleration by displacement of a gate electrode, it can conversely also be applied to an acceleration sensor in which the semiconductor substrate or the source or drain portion side is displaced.

As has been described above in detail, according to this invention, excellent effectiveness is demonstrated in being able to avoid adverse effects due to electrostatic force between a semiconductor substrate and movable electrode with a new structure. Furthermore, while the present invention has been shown and described with reference to the foregoing preferred embodiments, it will be apparent to those skilled in the art that changes in form and detail may be made therein without departing from the scope of the invention as defined in the appended claims. For example, if an electrode for movable electrode upward-movement use is provided above a beam (movable electrode) and a lower electrode is also disposed as an auxiliary on a substrate portion opposing the beam, and if an electrical potential, for example, equal to a potential applied to the movable electrode is established, acceleration detection of further high accuracy becomes possible.

What is claimed is:

1. A semiconductor acceleration sensor comprising:

a semiconductor substrate;

a beam structure supported by said semiconductor substrate and having a electrode disposed at a predetermined interval above said semiconductor substrate;

fixed electrodes disposed on said semiconductor substrate and provided with respect to said movable electrode so that a sensing portion is constituted by said movable electrode and said fixed electrodes and acceleration is detected by changes in current between said fixed electrodes generated by means of a displacement of said movable electrode caused by an acceleration on said sensing portion; and an electrode for movable electrode upward-movement use disposed at a height at least equal to a height at which said movable electrode is disposed, said electrode for movable electrode upward-movement use being given a potential difference against said movable electrode so as to counteract an attractive force of said movable electrode toward said semiconductor substrate, wherein said electrode for movable electrode upward-movement use includes an impurity diffusion layer formed on a high-resistance silicon substrate disposed above said movable electrode, said impurity diffusion layer opposing said movable electrode.

2. A semiconductor acceleration sensor comprising;

a semiconductor substrate;

a beam structure supported by said semiconductor substrate and having a movable electrode disposed of a predetermined interval above said semiconductor substrate;

fixed electrodes disposed on said semiconductor substrate and provided with respect to said movable electrode so that a sensing portion is constituted by said movable electrode and said fixed electrodes and acceleration is detected by changes in current between said fixed electrodes generated by means of a displacement of said movable electrode caused by an acceleration on said sensing portion; and an electrode for movable electrode upward-movement use disposed at a height identical to a height at which said movable electrode is disposed, said electrode for movable electrode upward-movement use being given a potential difference against said movable electrode so as to counteract an attractive force of said movable electrode toward said semiconductor substrate.

3. A semiconductor acceleration sensor according to claim 1, wherein said beam structure includes a beam portion supported by said semiconductor substrate and a weight suspended by said beam portion.

4. A semiconductor acceleration sensor according to claim 3, wherein said weight has a penetrating hole defined therein.

5. A semiconductor acceleration sensor according to claim 3, wherein said weight has a lattice configuration.

6. A semiconductor acceleration sensor according to claim 5, wherein a lattice width in said lattice configuration is identical to a width of said beam portion.

7. A semiconductor acceleration sensor according to claim 5 wherein a lattice width in said lattice configuration is identical to a minimum width of said beam portion.

8. A semiconductor acceleration sensor according to claim 1, wherein said beam structure has a doubly supported beam structure.

9. A semiconductor acceleration sensor according to claim 1, wherein said beam structure is structured so as to be supported from at least three directions.

10. A semiconductor acceleration sensor according to claims 1, further comprising a stopper member fixed to said semiconductor substrate and disposed proximate to said movable electrode, whereby a movement range of said movable electrode is restricted by means of said stopper member.

11. A semiconductor acceleration sensor according to claim 10, wherein said stopper member is composed of a material identical to said beam structure.

12. A semiconductor acceleration sensor according to claim 10, wherein said stopper member restricts displacement of said movable electrode in a horizontal direction.

13. A semiconductor acceleration sensor according to claim 10, wherein said stopper member restricts displacement of said movable electrode away from said semiconductor substrate.

14. A semiconductor acceleration sensor according to claim 8, wherein said sensing portion is disposed symmetrically with respect to said beam structure in a direction perpendicular to a lengthwise direction of said beam structure to said semiconductor substrate.

15. A semiconductor acceleration sensor according to claim 2, wherein said beam structure includes a beam portion supported by said semiconductor substrate and a weight suspended by said beam portion.

16. A semiconductor acceleration sensor according to claim 15, wherein said weight has a penetrating hole defined therein.

17. A semiconductor acceleration sensor according to claim 16, wherein said weight has a lattice configuration.

18. A semiconductor acceleration sensor according to claim 17, wherein a lattice width in said lattice configuration is identical to a width of said beam portion.

19. A semiconductor acceleration sensor according to claim 17, wherein a lattice width in said lattice configuration is identical to a minimum width of said beam portion.

20. A semiconductor acceleration sensor according to claim 2, wherein said beam structure has a doubly supported beam structure.

21. A semiconductor acceleration sensor according to claim 2, wherein said beam structure is structured so as to be supported from at least three directions.

22. A semiconductor acceleration sensor according to claim 2, further comprising a stopper member fixed to said semiconductor substrate and disposed proximate to said movable electrode, whereby a movement range of said movable electrode is restricted by means of said stopper member.

23. A semiconductor acceleration sensor according to claim 22, wherein said stopper member is composed of a material identical to said beam structure.

24. A semiconductor acceleration sensor according to claim 22, wherein said stopper member restricts displacement of said movable electrode in a horizontal direction.

25. A semiconductor acceleration sensor according to claim 22, wherein said stopper member restricts displacement of said movable electrode away from said semiconductor substrate.

26. A semiconductor acceleration sensor according to claim 20, wherein said sensing portion is disposed symmetrically with respect to said beam structure in a direction perpendicular to a span direction of said beam structure to said semiconductor substrate.

27. A semiconductor acceleration sensor comprising:

a supporting substrate;

a beam structure supported by said supporting substrate and having a movable electrode disposed above said supporting substrate of a predetermined interval;

an acceleration detector for detecting an acceleration applied to said sensor based on a displacement of said movable electrode displaced along a horizontal direction with respect to said supporting substrate; and a control electrode disposed at a height of at least equal to a height at which said movable electrode is disposed, said central electrode being located relative to said movable electrode and a potential being applied thereto for causing an electrostatic force to act on said movable electrode so as to keep said predetermined interval between said movable electrode and said supporting substrate constant.

28. A semiconductor acceleration sensor according to claim 27, wherein said control electrode is located above said movable electrode with a predetermined gap interposed therebetween.

29. A semiconductor acceleration sensor according to claim 28, wherein said predetermined interval between said movable electrode and said supporting substrate is equal to said predetermined gap between said movable electrode and said control electrode.

30. A semiconductor acceleration sensor according to claim 29, wherein said acceleration detector applies on said supporting substrate a constant potential with respect to said movable electrode, and said potential provided on said control electrode is equal to said constant potential applied to said supporting substrate.

31. A semiconductor acceleration sensor according to claim 30, wherein said supporting substrate is of a semiconductor substrate, and said acceleration detector includes a movable gate electrode horizontally protruding from said movable electrode along a direction parallel to a displacement direction of said movable electrode and a pair of fixed electrodes disposed on said supporting substrate wherein a channel current between said fixed electrodes varies in accordance with said displacement of said movable electrode due to said acceleration, said channel current being determined by a width of current passage between said fixed electrodes which varies with said displacement.

32. A semiconductor acceleration sensor according to claim 31, wherein said constant potential applied between said supporting substrate and said movable electrode is a potential which makes an insulated gate field effect transistor constituted of said movable gate electrode and fixed electrodes turn on.

33. A semiconductor acceleration sensor according to claim 28, wherein said beam structure has a doubly supported beam structure.

34. A semiconductor acceleration sensor according to claim 33, wherein said supporting substrate is a semiconductor substrate, and said acceleration detector includes a movable gate electrode horizontally protruding from said movable electrode along a direction parallel to a displacement direction of said movable electrode and a pair of fixed electrodes disposed on said supporting substrate, wherein a channel current between said fixed electrodes varies in accordance with said displacement of said movable electrode due to said acceleration said channel current being determined by a width of a current passage between said fixed electrodes which varies with said displacement.

35. A semiconductor acceleration sensor according to claim 34, wherein said acceleration detector is disposed symmetrically with respect to said beam structure in a direction perpendicular to a lengthwise direction of said beam structure.

36. A semiconductor acceleration sensor comprising:

a supporting substrate;

a beam structure supported by said supporting substrate at least at three anchor potions at corner portions thereof and having a movable electrode disposed above said supporting substrate at a predetermined interval;

an acceleration detector for detecting an acceleration applied thereon based on a displacement of said movable electrode due to an acceleration, applied thereto said displacement of said movable electrode being perpendicular to said supporting substrate; and a control electrode disposed at a height at least equal to a height at which said movable electrode is disposed, said control electrode being located relative to said movable electrode and a potential being applied thereto for causing an electrostatic force to act on said movable electrode so as to cancel out an attractive force of said movable electrode toward said supporting substrate.

37. A semiconductor acceleration sensor according to claim 36, wherein said control electrode is located above said movable electrode with predetermined gap interposed therebetween.

38. A semiconductor acceleration sensor according to claim 37, wherein said predetermined interval between said movable electrode and said supporting substrate is equal to said predetermined gap between said movable electrode and said control electrode.

39. A semiconductor acceleration sensor according to claim 37, wherein said acceleration detector applies on said supporting substrate a constant potential with respect to said movable electrode and whereby said attractive force is generated, and wherein said potential applied on said control electrode is equal to said constant potential applied on said supporting substrate.

40. A semiconductor acceleration sensor according to claim 39, wherein said supporting substrate is a semiconductor substrate, and said acceleration detector includes a movable gate electrode horizontally protruding from said movable electrode and a pair of fixed electrodes disposed on said supporting substrate so as to cause said predetermined interval to vary in accordance with said displacement of said movable electrode due to said acceleration applied thereto and wherein said acceleration detector senses said applied application by changes in current between said fixed electrodes.

41. A semiconductor acceleration sensor according to claim 40, wherein said constant potential applied between said supporting substrate and said movable electrode is a potential which makes an insulated gate field effect transistor constituted of said movable gate electrode and fixed electrodes turn on.

42. A semiconductor acceleration sensor according to claim 36, wherein said control electrode is disposed at a height identical to a height at which said movable electrode is disposed.

43. A semiconductor acceleration sensor according to claim 42, wherein said acceleration detector applies on said supporting substrate a constant potential with respect to said movable electrode and whereby said attractive force is generated, and wherein said potential provided on said control electrode is a constant potential which generates said electrostatic force to cancel out said attractive force.

44. A semiconductor acceleration sensor according to claim 43, wherein said supporting substrate is a semiconductor substrate, and said acceleration detector includes a movable gate electrode horizontally protruding from said movable electrode and a pair of fixed electrodes disposed on said supporting substrate so as to cause said predetermined interval to vary in accordance with said displacement of said movable electrode due to said acceleration applies thereto, and wherein said acceleration detector senses said applied acceleration by changes in current between said fixed electrodes.

45. A semiconductor acceleration sensor according to claim 44, wherein said constant potential applied between said supporting substrate and said movable electrode is a potential which makes an insulated gate field effect transistor constituted of said movable gate electrode and fixed electrodes turn on.

46. A semiconductor acceleration sensor comprising:

a supporting substrate;

a beam structure supported by said supporting substrate and having a movable electrode disposed above said supporting substrate at a predetermined interval;

an acceleration detector for detecting an acceleration applied thereon based on a displacement of said movable electrode due to an acceleration, said acceleration detector including an insulated gate type field effect transistor structure which is formed between said movable electrode and said supporting substrate; and a control electrode provided at a portion other than under said movable electrode on said supporting substrate and to which is applied a constant voltage for cancelling out an attractive electrostatic force acting between said movable electrode and said supporting substrate during a period wherein said insulated gate type field effect transistor structure is turned on.

47. A semiconductor acceleration sensor according to claim 46, wherein said control electrode is disposed at a height equal to or greater than a height at which said movable electrode is disposed.

48. A semiconductor acceleration sensor according to claim 47, wherein said supporting substrate is a semiconductor substrate, and said insulated gate type field effect transistor structure of said acceleration detector includes a movable gate electrode horizontally protruding from said movable electrode and a pair of fixed electrodes disposed on said supporting substrate in correspondence with said movable gate electrode so as to sense said acceleration based on changes in current between said fixed electrodes which vary in accordance with said displacement of said movable electrode due to said acceleration.

49. A semiconductor acceleration sensor according to claim 48, wherein said control electrode is located above said movable electrode with a predetermined gap interposed therebetween.

50. A semiconductor acceleration sensor according to claim 49, wherein said predetermined interval between said movable electrode and said supporting substrate is equal to said predetermined gap between said movable electrode and said control electrode.

51. A semiconductor acceleration sensor according to claim 49, wherein said acceleration detector applies on said supporting substrate a constant potential with respect to said movable gate electrode which makes said insulated gate type field effect transistor structure turn on and whereby said attractive electrostatic force is generated, and wherein said constant voltage applied to said control electrode is equal to said constant potential provided on said supporting substrate.

52. A semiconductor acceleration sensor according to claim 48, wherein said control electrode is disposed at a height identical to a height at which said movable electrode is disposed.

53. A semiconductor acceleration sensor according to claim 52, wherein said acceleration detector applies on said supporting substrate a constant potential with respect to said movable gate electrode which makes said insulated gate type field effect transistor structure turn on and whereby said attractive electrostatic force is generated.

54. A semiconductor acceleration sensor according to claim 46, Wherein said beam structure includes a beam portion supported by said supporting substrate and a weight suspended by said beam portion.

55. A semiconductor acceleration sensor according to claim 54, wherein said weight has a penetrating hole defined therein.

56. A semiconductor acceleration sensor according to claim 54, wherein said weight has a lattice configuration.

57. A semiconductor acceleration sensor according to claim 56, wherein a lattice width in said lattice configuration is identical to a width of said beam portion.

58. A semiconductor acceleration sensor according to claim 56, wherein a lattice width in said lattice configuration is identical to a minimum width of said beam portion.

59. A semiconductor acceleration sensor according to claim 46, wherein said beam structure has a doubly supported beam structure.

60. A semiconductor acceleration sensor according to claim 46, wherein said beam structure is structured so as to be supported from at least three directions.

61. A semiconductor acceleration sensor according to claim 46, further comprising a stopper member fixed to said supporting substrate and disposed proximate to said movable electrode, whereby a movement range of said movable electrode is restricted by means of said stopper member.

62. A semiconductor acceleration sensor according to claim 61, wherein said stopper member is composed of a material identical to said beam structure.

63. A semiconductor acceleration sensor according to claim 61, wherein said stopper member restricts displacement of said movable electrode in a horizontal direction with respect to said supporting substrate.

64. A semiconductor acceleration sensor according to claim 61, wherein said stopper member restricts displacement of said movable electrode away from said supporting substrate.

65. A semiconductor acceleration sensor according to claim 59, wherein at least one pair of said insulated gate type field effect transistor effect transistor structures is disposed symmetrically with respect to said beam structure in a direction perpendicular to a lengthwise direction of said beam structure.

* * * * *